US012690007B2

(12) United States Patent
Wu et al.

(10) Patent No.: US 12,690,007 B2
(45) Date of Patent: Jul. 21, 2026

(54) METHOD FOR DETERMINING LOCATION OF WIRELESS NETWORK BASE STATION

(71) Applicant: Alpha Networks Inc., Hsinchu (TW)

(72) Inventors: Meng-Han Wu, Hsinchu (TW); Shang-Hung Weng, Hsinchu (TW); Yi-Jin Lee, Hsinchu (TW); Jih-Hsin Liu, Hsinchu (TW); Chia-Shuo Yeh, Hsinchu (TW); Shih-Fang Ao, Hsinchu (TW); Jen-Hung Yang, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 296 days.

(21) Appl. No.: 18/731,424

(22) Filed: Jun. 3, 2024

(65) Prior Publication Data

US 2025/0016729 A1    Jan. 9, 2025

(30) Foreign Application Priority Data

Jul. 3, 2023    (TW) ................................. 112124726

(51) Int. Cl.
| | |
|---|---|
| *H04W 24/10* | (2009.01) |
| *H04B 17/309* | (2015.01) |
| *H04B 17/318* | (2015.01) |
| *H04W 64/00* | (2009.01) |

(52) U.S. Cl.
CPC ........ *H04W 64/003* (2013.01); *H04B 17/318* (2015.01); *H04B 17/346* (2023.05); *H04W 24/10* (2013.01)

(58) Field of Classification Search
CPC ..... H04W 4/029; H04W 24/10; H04W 64/00; H04W 64/003
See application file for complete search history.

(56) References Cited

U.S. PATENT DOCUMENTS

| | | | |
|---|---|---|---|
| 10,254,378 B1 * | 4/2019 | Dang ................. | G01C 21/1654 |
| 2015/0186506 A1 | 7/2015 | Vandevoorde et al. | |
| 2018/0263077 A1 | 9/2018 | Lu | |

OTHER PUBLICATIONS

TW OA issued on Mar. 15, 2024.

* cited by examiner

*Primary Examiner* — Sam Bhattacharya
(74) *Attorney, Agent, or Firm* — WPAT, PC

(57) ABSTRACT

A method for determining location of wireless network base station comprises obtaining a plurality of position information, wherein each one of the position information corresponds to one of the user devices; estimating received power estimation values in accordance with relative displacement between the user devices and each of the candidate locations; determining construction possibilities of the candidate locations, wherein each of the construction possibilities shows possibility of choosing a corresponding one of the candidate locations to be the place for building the wireless network base station, and sorting the candidate locations in accordance with the construction possibilities to form a predicting sequence; selecting a preset amount of candidate locations from beginning of the predicting sequence as a starting sequence; and performing an actual measuring operation in each candidate location listed in the starting sequence and determining the location for building the wireless network base station in accordance with measurement results obtained from the actual measuring operations.

12 Claims, 18 Drawing Sheets

| 301 | 308 | 309 | 316 | 317 | 324 | 325 | 332 | 333 | 340 | 341 | 348 | 349 |
|-----|-----|-----|-----|-----|-----|-----|-----|-----|-----|-----|-----|-----|
| 302 | 307 | 310 | 315 | 318 | 323 | 326 | 331 | 334 | 339 | 342 | 347 | 350 |
| 303 | 306 | 311 | 314 | 319 | 322 | 327 | 330 | 335 | 338 | 343 | 346 | 351 |
| 304 | 305 | 312 | 313 | 320 | 321 | 328 | 329 | 336 | 337 | 344 | 345 | 352 |

FIG. 3

| candidate location | user device | received power estimation value | estimation set |
|--------------------|-------------|---------------------------------|----------------|
| 301 | 130 | P301_130 | T301 |
|     | 132 | P301_132 |      |
|     | 134 | P301_134 |      |
|     | 136 | P301_136 |      |
|     | 138 | P301_138 |      |
| 302 | 130 | P302_130 | T302 |
|     | 132 | P302_132 |      |
|     | 134 | P302_134 |      |
|     | 136 | P302_136 |      |
|     | 138 | P302_138 |      |
| ⋮   | ⋮   | ⋮        | ⋮    |
| 352 | 130 | P352_130 | T352 |
|     | 132 | P352_132 |      |
|     | 134 | P352_134 |      |
|     | 136 | P352_136 |      |
|     | 138 | P352_138 |      |

FIG. 4

| data range | weight adjustment |
|---|---|
| $\geq$ -80 dbm | 4 |
| $<$ -80 dbm & $\geq$ -90 dbm | 3 |
| $<$ -90 dbm & $\geq$ -100 dbm | 2 |
| $<$ -100 dbm | 1 |

FIG. 6

| candidate location | user device | SINR value | SINR measurement set |
|---|---|---|---|
| 301 | 130 | SINR301_130 | SINR301 |
|  | 132 | SINR301_132 |  |
|  | 134 | SINR301_134 |  |
|  | 136 | SINR301_136 |  |
|  | 138 | SINR301_138 |  |
| 302 | 130 | SINR302_130 | SINR302 |
|  | 132 | SINR302_132 |  |
|  | 134 | SINR302_134 |  |
|  | 136 | SINR302_136 |  |
|  | 138 | SINR302_138 |  |
| ⋮ | ⋮ | ⋮ | ⋮ |
| 352 | 130 | SINR352_130 | SINR352 |
|  | 132 | SINR352_132 |  |
|  | 134 | SINR352_134 |  |
|  | 136 | SINR352_136 |  |
|  | 138 | SINR352_138 |  |

FIG. 9

| throughput measurement location (candidate location) | TP138 | TP136 | TP134 | TP132 | TP130 | TT |
|---|---|---|---|---|---|---|
| 320 | 28.32 | 26.69 | 27.59 | 28.50 | 28.53 | 139.63 |
| 306 | 25.86 | 25.36 | 20.62 | 25.36 | 27.85 | 125.05 |
| 313 | 27.47 | 26.78 | 28.63 | 19.90 | 22.10 | 124.88 |
| 326 | 27.97 | 26.47 | 17.28 | 21.18 | 27.76 | 120.66 |
| 331 | 27.96 | 25.31 | 13.05 | 24.05 | 28.47 | 118.84 |
| 319 | 18.71 | 27.03 | 17.68 | 28.08 | 26.16 | 117.66 |
| 315 | 27.24 | 23.38 | 17.18 | 17.90 | 28.18 | 113.88 |
| 303 | 26.85 | 24.33 | 17.38 | 28.14 | 16.46 | 113.16 |
| 338 | 28.11 | 28.01 | 17.50 | 10.99 | 27.44 | 112.05 |

FIG. 17

METHOD FOR DETERMINING LOCATION OF WIRELESS NETWORK BASE STATION

FIELD OF THE INVENTION

The present invention is related to wireless network building technology, specifically being related to method for determining location for building wireless network base station.

BACKGROUND OF THE INVENTION

With rapid development of mobile communication, it is very common to set up multiple devices that need to be connected to the network for information acquisition or mutual communication and cooperation in the working environment. In order to operate the devices smoothly, a wireless network with good communication efficiency is very important. For most working environments, the location of working equipment must be arranged according to the geographical environment, such as partition walls or columns, etc. Therefore, it is very important to arrange the location of the wireless network base station in accordance with the locations of the devices using the wireless network.

In the existing technology, when it is necessary to arrange the location of a wireless network base station, signal measurement operation and performance verification operation are usually performed in every possible location for building the wireless network base station, and finally the best location for building the base station can be confirmed in accordance with the results of measurement and verification. However, in order to provide the best network environment, it is necessary to consider various issues while performing the measurement and verification. The issues might comprise whether the working devices could be connected to the network smoothly, whether the connection is stable and provides relative high data throughput for each working device, and whether a good overall performance could be achieved when all devices are connected to and working on the network. Therefore, it would take a lot of manpower and time to determine a suitable location for building the wireless network base station.

SUMMARY OF THE INVENTION

In view of the drawbacks existed in the technology used nowadays, one object of the present invention is to provide a method for determining location of wireless network base station so as to reduce an amount of locations in which operations for measuring signal strength and throughput are performed, such that manpower and time cost for determining the location where the wireless network base station is built can be reduced as well.

In one aspect, the present invention provides a method for determining location of wireless network base station, which is adapted to determine a base location of the wireless network base station within a specific area in accordance with distribution of a plurality of user devices within the specific area. The method comprises: deciding a plurality of candidate locations within the specific area; retrieving a plurality of position information, wherein each of the position information corresponds to a position of one of the user devices; obtaining a plurality of received power estimation values, wherein each of the received power estimation values is a signal strength of a first wireless signal received by corresponding one of the user devices when the first wireless signal is transmitted from corresponding one of the candidate locations, and the signal strength is generated by a predetermined signal strength estimation procedure in accordance with obstacles within the specific area and a relative displacement obtained from the corresponding one of the candidate locations and the position information of the corresponding one of the user devices; obtaining a predicting sequence composed of the candidate locations from sorting a plurality of construction probabilities, each of which is corresponded to one of the candidate locations, from high to low, wherein, the construction probabilities are determined by a plurality of estimation sets, and each of the estimation sets is corresponded to one of the candidate locations and composed of the received power estimation values each corresponding to one of all the user devices when the first wireless signal is transmitted from the corresponded candidate locations; selecting a preset amount of the candidate locations from the predicting sequence in order as a starting sequence; performing, for each of the candidate locations of the starting sequence, an actual measuring operation in the candidate location to obtain a corresponded measurement result; and deciding the base location in accordance with the obtained measurement results.

In one embodiment, the position information comprises a coordinate data which represents the corresponded position of one of the user devices in coordinates.

In one embodiment, the step of obtaining the predicting sequence composed of the candidate locations from sorting the construction probabilities, each of which is corresponded to one of the candidate locations, from high to low, wherein, the construction probabilities are determined by the estimation sets, and each of the estimation sets is corresponded to one of the candidate locations and composed of the received power estimation values each corresponding to one of all the user devices when the first wireless signal is transmitted from the corresponded candidate locations, comprises: obtaining, for each of the candidate locations, an average power corresponded thereto by averaging the received power estimation values of the estimation set corresponded thereto; setting, for each of the candidate locations, a first weight corresponded thereto in accordance with an order of the average power corresponded thereto obtained by sorting the average powers from high to low; and determining, for each of the candidate locations, the construction probability corresponded thereto in accordance with the first weight corresponded thereto.

In one embodiment, the step of obtaining the predicting sequence composed of the candidate locations from sorting the construction probabilities, each of which is corresponded to one of the candidate locations, from high to low, wherein, the construction probabilities are determined by the estimation sets, and each of the estimation sets is corresponded to one of the candidate locations and composed of the received power estimation values each corresponding to one of all the user devices when the first wireless signal is transmitted from the corresponded candidate locations, comprises: retrieving a range table, wherein the range table comprises a plurality of data ranges and a plurality of weight adjustments while each of the data ranges being corresponded to one of the weight adjustments; performing, for each of the candidate locations, a judgement operation to obtain a second weight corresponded thereto; and determining, for each of the candidate locations, the construction probability corresponded thereto in accordance with the second weight corresponded thereto. Wherein, the judgement operation comprises: retrieving, for each of the received power estimation value of the estimation set corresponded to the candidate location, a temporary adjustment corresponding to the received power estimation value, wherein the temporary adjustment is the weight adjustment to which the data range covering the received power estimation value is corresponded; and averaging the temporary adjustments corresponding to the received power estimation values of the estimation set as the second weight.

In one embodiment, the step of obtaining the predicting sequence composed of the candidate locations from sorting the construction probabilities, each of which is corresponded to one of the candidate locations, from high to low, wherein, the construction probabilities are determined by the estimation sets, and each of the estimation sets is corresponded to one of the candidate locations and composed of the received power estimation values each corresponding to one of all the user devices when the first wireless signal is transmitted from the corresponded candidate locations, comprises: obtaining, for each of the candidate locations, an average power corresponded thereto by averaging the received power estimation values of the estimation set corresponded thereto; setting, for each of the candidate locations, a first weight corresponded thereto in accordance with an order of the average power corresponded thereto obtained by sorting the average powers from high to low; retrieving a range table, wherein the range table comprises a plurality of data ranges and a plurality of weight adjustments while each of the data ranges being corresponded to one of the weight adjustments; performing, for each of the candidate locations, a judgement operation to obtain a second weight corresponded thereto; obtaining, for each of the candidate locations, a distance summation by summing a plurality of distances each being between the candidate location and one of all the user devices; setting, for each of the candidate locations, a third weight corresponded thereto in accordance with the distance summation corresponded thereto; and determining, for each of the candidate locations, the construction probability corresponded thereto in accordance with the first weight, the second weight and the third weight corresponded thereto. Wherein, the judgement operation comprises: retrieving, for each of the received power estimation value of the estimation set corresponded to the candidate location, a temporary adjustment corresponding to the received power estimation value, wherein the temporary adjustment is the weight adjustment to which the data range covering the received power estimation value is corresponded; and averaging the temporary adjustments corresponding to the received power estimation values of the estimation set as the second weight.

In one embodiment, the method further comprises a SINR threshold determination operation which is performed before performing the actual measuring operation, wherein the SINR threshold determination operation comprises: step A: obtaining a plurality of average powers, wherein each of the average powers corresponds to one of the candidate locations and is obtained by averaging the received power estimation values of the estimation set corresponding to the corresponded one of the candidate locations; step B: sorting the average powers from high to low to obtain a sorting result and generating a SINR measurement sequence by arranging the candidate locations in accordance with an order in which the average powers corresponded thereto are arranged in the sorting result; step C: selecting from beginning of the SINR measurement sequence a first one of the candidate locations in which a SINR measurement operation has not been performed as a SINR measurement location; step D: performing the SINR measurement operation in the SINR measurement location and recording a SINR measurement set corresponding to the SINR measurement location accordingly, wherein the SINR measurement set corresponding to the SINR measurement location comprises a plurality of SINR values, and each of the SINR values is obtained by performing the SINR measurement operation comprising measuring a second wireless signal, which is emitted from a place where one of the user devices is, in the SINR measurement location; step E: determining whether an amount of the recorded SINR measurement sets is equal to a first preset amount after each time the SINR measurement set being recorded; step F: when a determination result of the step E is false, selecting one of the candidate locations in which the SINR measurement operation has not been performed in accordance with the SINR measurement set corresponding to the SINR measurement location as a newly selected SINR measurement location and entering the step D with replacing the SINR measurement location by the newly selected SINR measurement location; and step G: when the determination result of the step E is true, determining a SINR threshold in accordance with the recorded SINR measurement sets and providing the SINR threshold for the actual measuring operation.

In one embodiment, the step F comprises: selecting the user device whose SINR value measured in the SINR measurement location is less than the SINR values of any other of the user devices measured in the SINR measurement location; obtaining the position information of the selected user device; selecting one of the candidate locations which are determined to be closer to the user device than the SINR measurement location is in accordance with the relative displacement obtained from the obtained position information and the SINR measurement location as a prepared SINR measurement location; and determining what to proceed in accordance with whether the SINR measurement operation has been performed in the prepared SINR measurement location, which comprises: replacing the SINR measurement location by the prepared SINR measurement location and entering the step D when the SINR measurement operation has not been performed in the prepared SINR measurement location; and entering the step C when the SINR measurement operation has been performed in the prepared SINR measurement location.

In one embodiment, the step of selecting one of the candidate locations which are determined to be closer to the user device than the SINR measurement location is in accordance with the relative displacement obtained from the obtained position information and the SINR measurement location as the prepared SINR measurement location, comprises: obtaining a movement amount by scaling the obtained relative displacement down to a predetermined ratio; deciding a reference position which is reached by moving from the SINR measurement location for the movement amount; and taking one of the candidate locations which is nearest to the reference position as the prepared SINR measurement location.

In one embodiment, the step of determining the SINR threshold in accordance with the recorded SINR measurement sets comprises: for each of the recorded SINR measurement sets, selecting a lowest one of the SINR values in the recorded SINR measurement set as a lowest SINR value corresponding to the recorded SINR measurement set; and taking one of the lowest SINR values each corresponding to one of the recorded SINR measurement set as the SINR threshold.

In one embodiment, the actual measuring operation comprises: step GA: selecting from beginning of the starting sequence a first one of the candidate locations for which an effective location judgement operation has not been performed as a prepared throughput measurement location; step GB: when none of the SINR measurement sets is found to be corresponded to the prepared throughput measurement location, performing the SINR measurement operation in the prepared throughput measurement location and recording the SINR measurement set corresponding to the prepared throughput measurement location accordingly; step GC: performing the effective location judgement operation for the prepared throughput measurement location, wherein the effective location judgement operation determines that the prepared throughput measurement location should be comprised in a throughput measurement location set when the SINR values of the SINR measurement set corresponding to the prepared throughput measurement location are higher than the SINR threshold, and determines that the prepared throughput measurement location should not be comprised in the throughput measurement location set when anyone of the SINR values of the SINR measurement set corresponding to the prepared throughput measurement location is not higher than the SINR threshold; step GD: when the step GC determines that the prepared throughput measurement location should be comprised in the throughput measurement location set, setting the prepared throughput measurement location to be a throughput measurement location comprised in the throughput measurement location set, performing a throughput measurement operation in the throughput measurement location and storing a plurality of measured throughput generated thereby as a measured throughput set, wherein each of the measured throughput corresponds to a data throughput of one of the user device in the throughput measurement location; step GE: when the step GC determines that the prepared throughput measurement location should not be comprised in the throughput measurement location set, replacing the prepared throughput measurement location by one of the candidate locations in which the throughput measurement operation has not been performed in accordance with the measured SINR measurement set and entering the step GB with the replaced prepared throughput measurement location; and step GF: outputting the throughput measurement location set and the measured throughput sets each corresponding to one of the throughput measurement locations comprised in the throughput measurement location set after the effective location judgement operation is performed for all the candidate locations of the starting sequence.

In one embodiment, the step GE comprises: selecting one of the user devices, wherein the SINR value corresponding to the selected user device and measured in the prepared throughput measurement location is lower than the SINR values corresponding to others of the user devices and measured in the prepared throughput measurement location; obtaining the position information of the selected user device; selecting one of the candidate locations, which is closer to the user device than the prepared throughput measurement location is, as a prepared location in accordance with the relative displacement obtained from the obtained position information and the prepared throughput measurement location; and determining what to proceed in accordance with whether the throughput measurement operation has been performed in the prepared location, comprising: replacing the prepared throughput measurement location by the prepared location and entering the step GB thereafter when the throughput measurement operation has not been performed in the prepared location; and entering the step GA when the throughput measurement operation has been performed in the prepared location.

In one embodiment, the method further comprises: setting the candidate locations neighboring to the throughput measurement location to be comprised in a prepared compensation location set when an amount of the throughput measurement locations comprised in the throughput measurement location set is one; when the amount of the throughput measurement locations comprised in the throughput measurement location set is at least two, comprising: calculating, for each of the throughput measurement locations comprised in the throughput measurement location set, a throughput summation corresponding to the throughput measurement location, which is summation of the measured throughput of the measured throughput set corresponding to the throughput measurement location; selecting, from high to low, a second preset amount of the throughput summations; and setting the candidate locations neighboring to each of the throughput measurement locations corresponding to the selected throughput summations to be comprised in the prepared compensation location 1 set; obtaining, for each the throughput measurement location comprised in the prepared compensation location set, the SINR measurement set corresponding to the throughput measurement location and setting the SINR measurement set as a compensation set; and performing a compensation measurement operation for each the throughput measurement location comprised in the prepared compensation location set. Wherein, the compensation measurement operation comprises: determining whether the SINR values comprised in the compensation set corresponding to the throughput measurement location are all higher than the SINR threshold; and when the determination is true, setting the candidate location corresponding to the compensation set as a compensation location, performing the throughput measurement operation in the compensation location and storing the measured throughput generated thereby as the measured throughput set corresponding to the compensation location, and outputting the compensation location and the measured throughput set corresponding to the output compensation location.

By applying the technique solutions described above, the method for determining location of the wireless network base station provided by the present invention determines construction probabilities of candidate locations for building wireless base station in advance by using estimated signal power, therefore real measurement operations could be performed only in the candidate locations with high construction probability so that an amount of the real measurement operations is reduced accordingly. Furthermore, the construction probabilities can be adjusted by referencing to the estimated average power of each user device in the candidate location, the data range covering the estimated average power or distance between the user device and the candidate location so that accuracy of predictions of the construction probabilities could be improved. Moreover, it is possible to reduce the probability of location misjudgment due to wrong estimation by determining whether extra locations in which measurement is performed are necessary in accordance with results of real measurements performed in the selected candidate locations.

BRIEF DESCRIPTION OF THE DRAWINGS

FIG. 3 is a schematic diagram showing division of candidate locations in accordance with one embodiment of the present invention.

FIG. 4 is a schematic diagram showing correlations between estimation set and received power estimation values estimated in accordance with one embodiment of the present invention.

FIG. 6 is schematic diagram showing a range table in accordance with one embodiment of the present invention.

FIG. 9 is a schematic diagram showing contents of a plurality of SINR measurement sets in accordance with one embodiment of the present invention.

FIG. 17 is a schematic diagram showing the throughput measurement location set and the corresponded measured throughput set in accordance with one embodiment of the present invention.

DETAILED DESCRIPTION OF PREFERRED EMBODIMENTS

Figure 1:
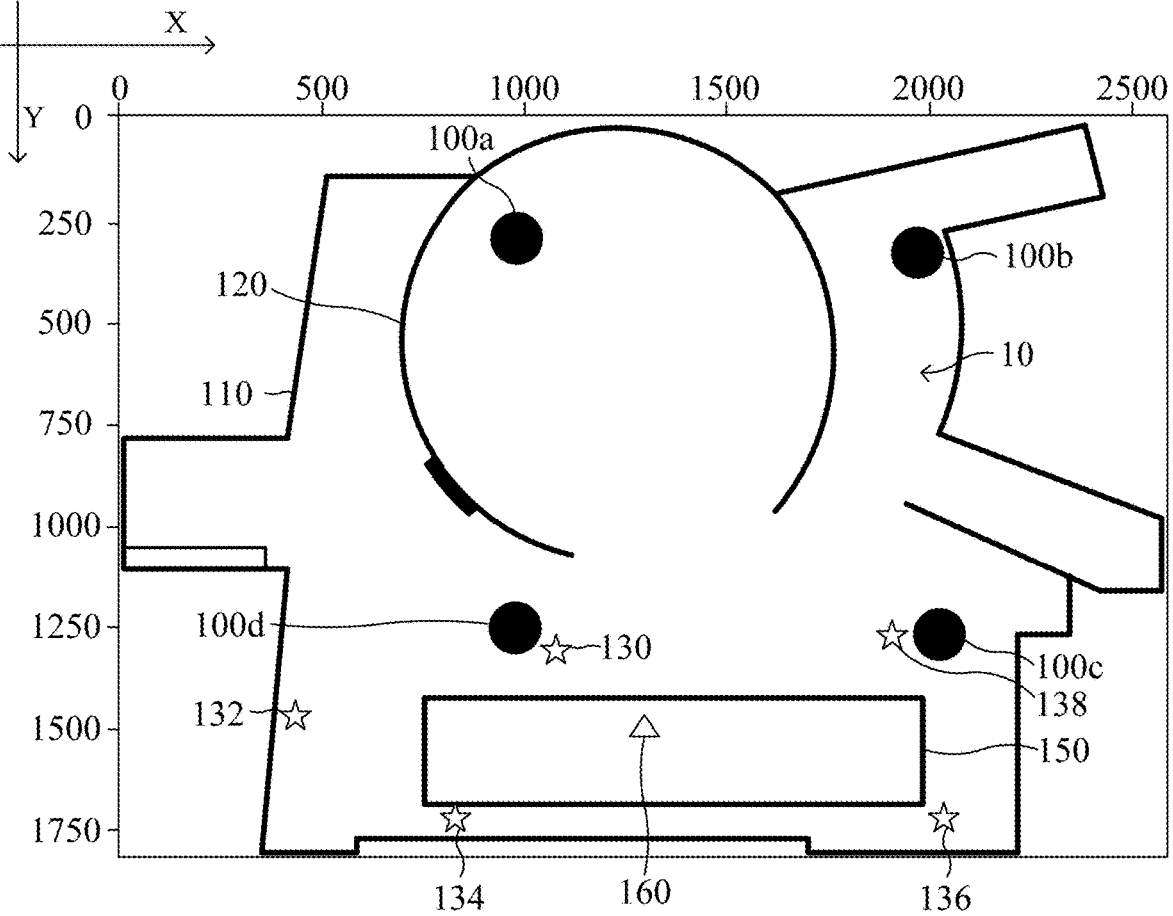
FIG. 1 is a schematic diagram showing an environment in which the method for determining location of wireless network base station is performed in accordance with one embodiment of the present invention.
Figure 2:
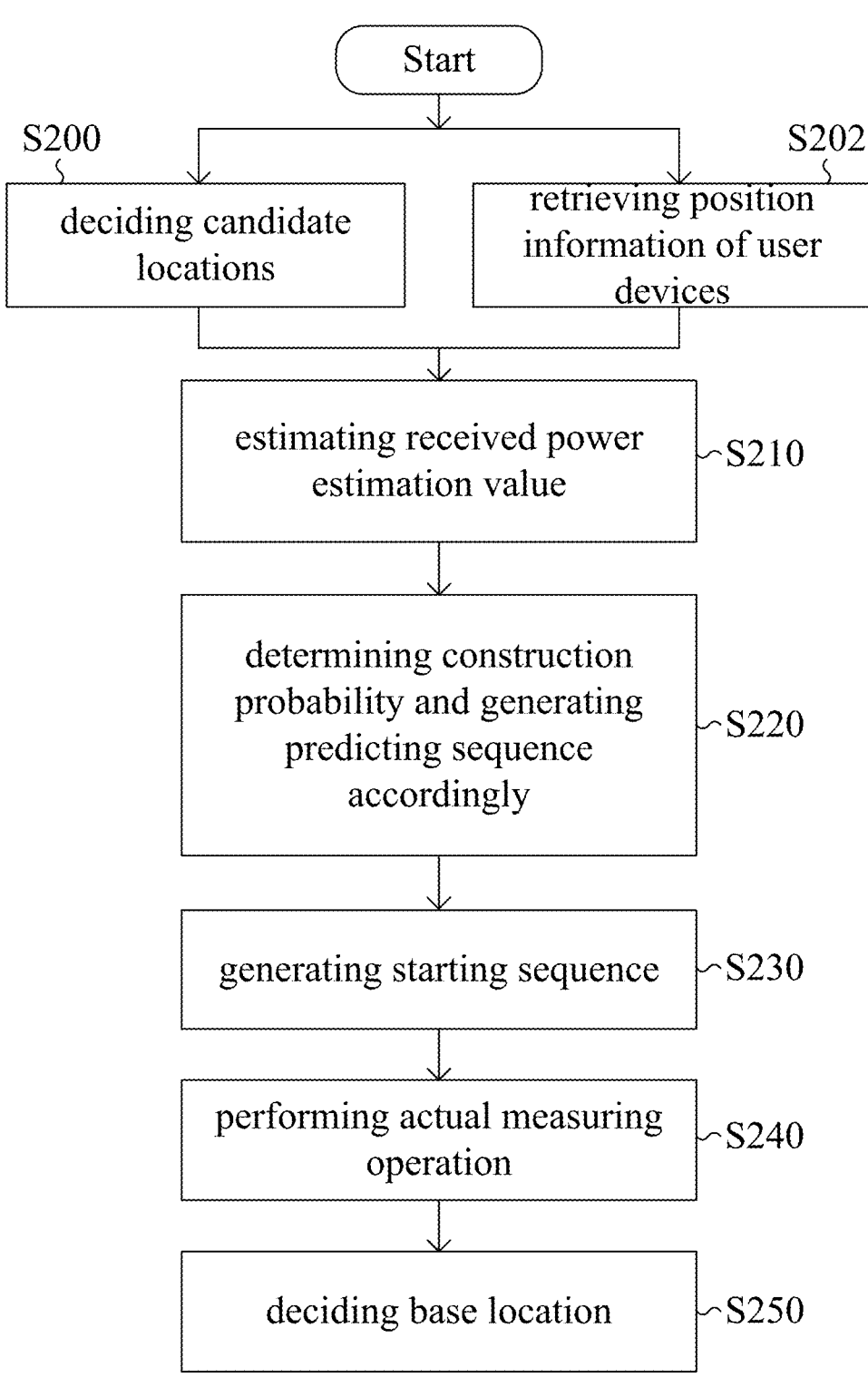
FIG. 2 is a flow chart of the method for determining location of wireless network base station in accordance with one embodiment of the present invention.

In order to clearly describe the technique solutions provided in the present invention, FIG. 1 and FIG. 2 would be referenced to with the embodiments described below, wherein FIG. 1 is a schematic diagram showing an environment in which the method for determining location of wireless network base station is performed in accordance with one embodiment of the present invention, and FIG. 2 is a flow chart of the method for determining location of wireless network base station in accordance with one embodiment of the present invention.

As shown in FIG. 1, the outer wall 110, the partition wall 120 and the pillars 100a, 100b, 100c and 100d together form a specific area 10 with irregular shape and obstacles in the embodiment. It is assumed that, in the specific area 10, there are five user devices 130, 132, 134, 136 and 138 for which a wireless network is necessary, and locations in which a wireless network base station 160 could be built is limited to a base building area 150, which is a rectangular with 13 meters long and four meters wide. It is noted that although the base building area 150 in this embodiment is designed to be a continuous area, it could be composed of several independent areas in other embodiments while necessary. Those with ordinary skill in the art could determine the location of the wireless network base station in accordance with the technique solutions provided in the present invention even if the base building area 150 is composed of several independent areas.

The flow chart shown in FIG. 2 will be applied in the following to describe the technique solutions for determining a base location in which the wireless network base station 160 is built. Please refer to FIG. 1 and FIG. 2, in the embodiment, position information of the base building area 150 within the specific area 10 is retrieved while the base building area 150 is divided into several non-overlapped candidate location in the step S200, and moreover, the position information of each of the user devices 130-138 within the specific area is also retrieved in the step S202. Please also refer to FIG. 3, which is a schematic diagram showing how the candidate locations are divided from the base building area 150 in accordance with one embodiment of the present invention. In the embodiment, a size of the candidate location is a square with a side length of 1 meter and therefore the base building area 150 could be divided into 52 candidate locations 301-352.

It is noted that the position information can be represented in any suitable way. For example, when a location is expressed as distance and angles from a reference point, the position information could comprise the distance from the reference point and the angle from a reference direction. In the embodiment, the position information is represented by a coordinate system whose origin is an upper-left corner of a block covering the specific area 10, that is, the coordinate system shown in FIG. 1 is applied to represent the position information of any location within the specific area 10. It can be found from FIG. 1 that the upper-left corner of FIG. 1 is set to be the coordinate origin, and the direction toward right is set as the X axis while the downward direction is set as the Y axis. Further in another embodiment, three axes could be used for building a three-dimensional coordinate system in order to represent the locations within a three-dimensional space. In other words, the position information is a coordinate data comprising coordinates defined by the coordinate system in the embodiment. Accordingly, the position information of the candidate locations 301-352 and the user devices 130-138 can be represented by using coordinate data. In order to make the technique solutions to be understood easily, a planar space is used as the specific area 10 in the description made below. However, the technique solutions can also be applied to the case in which the specific area 10 is a three-dimensional space.

As described above, because the position information of the base building area 150 is retrieved and division of the base building area 150 is defined in the step S200, the position information of each of the candidate locations 301-352 can be generated in accordance with the data obtained in the step S200. After obtaining the position information of the candidate location 301-352 from the step S200 and the position information of the user devices 130-138 from the step S202, a plurality of received signal power can be generated by a predetermined signal strength estimation procedure in accordance with obstacles within the specific area 10 and relative displacement between the candidate locations 301-352 and the user devices 130-138 in the step S210. Wherein, the relative displacement between one user device and one candidate location comprises the distance existed therebetween and the direction from one to another, the obstacles comprise the shape and position of the outer wall 110, the shape and position of the partition wall 120 and positions of the pillars 100a-100d, and each of the received signal power is a signal strength of a wireless signal received by one of the user devices 130-138 when the wireless signal is transmitted from one of the candidate locations 301-352, wherein the received signal power is estimated by the predetermined signal strength estimation procedure in accordance with obstacles within the specific area and the relative displacement between the corresponded candidate location and the corresponded user device. In following descriptions, the received signal power relating to a specific user device and a specific candidate location is referred to as a received power estimation value corresponding to the specific candidate location and the specific user device or referred to as a received power estimation value between the specific candidate location and the specific user device. For example, when a first wireless signal is transmitted from the candidate location 305 to the user device 130, the signal power of the first wireless signal estimated to be received by the user device 130 by applying the predetermined signal strength estimation procedure would be referred to as the received power estimation value corresponding to the candidate location 305 and the user device 130 or referred to as the received power estimation value between the candidate location 305 and the user device 130, and is marked as P305_130. Therefore, after the estimation performed in the step S210, the received power estimation values between each candidate location and user device, such as the received power estimation values P301_130, P301_132, P301_134, . . . , P302_130, P302_132, . . . , P352_136 and P352_138 as shown in FIG. 4, can be obtained.

It is noted that the predetermined signal strength estimation procedure mentioned above could be constructed from any existed estimation models suitable for current case. For example, the estimation module could be the Free-Space Path Loss (FSPL) propagation model or International Telecommunication Union-Radio communication (ITU-R) P.1238 propagation model and is not limited in the present invention.

After completing the estimation performed in the step S210, the received power estimation values corresponding to a same one of the candidate location are grouped to form an estimation set corresponding to the candidate location in the step S220. For example, the received power estimation values corresponding to the candidate location 301, which are the received power estimation values P301_130, P301_132, P301_134, P301_136 and P301_138, are grouped to form the estimation set T301, and the received power estimation values corresponding to the candidate location 302, which are the received power estimation values P302_130, P302_132, P302_134, P302_136 and P302_138, are grouped to form the estimation set T302. In the step S220, each of the received power estimation values is grouped into one of the estimation sets T301-T352 as shown in FIG. 4. After the received power estimation values are all grouped, further operations are performed in the step S220 to determine a plurality of construction probabilities corresponding to the candidate locations 301-352, each of which represents a level of possibility of selecting the corresponded candidate location as the base location, in accordance with the estimation sets T301-T352 and generate a predicting sequence composed of the candidate locations 301-152 arranged in a same order as the corresponded construction probabilities being arranged by sorting the construction probabilities from high to low.

Figure 5A:
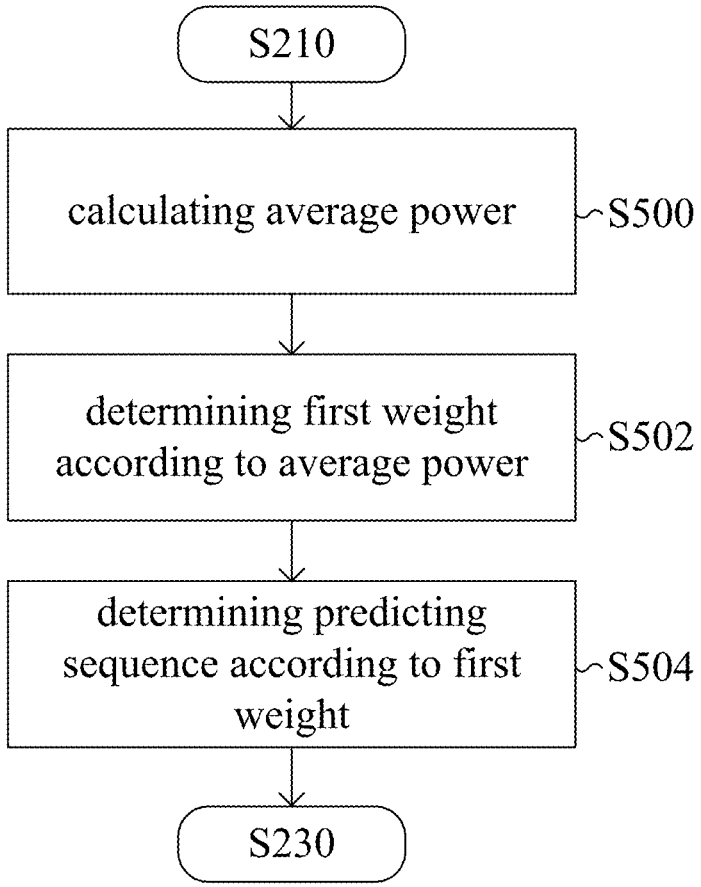
FIG. 5A is a flow chart showing determining construction probabilities of candidate locations in accordance with one embodiment of the present invention.

It is noted that different solutions could be used to realize the operations for determining the construction probabilities corresponding to the candidate locations 301-352 in accordance with the estimation sets T301-T352. For example, in one embodiment, a ratio between two construction probabilities corresponding to two of the candidate locations 301-352 can be determined in accordance with a ratio between two of the estimation sets T301-T352 corresponding to the two candidate locations. In another embodiment, as shown in FIG. 5A, a plurality of average powers are obtained in the step S500, wherein the average powers are one-to-one corresponding to the estimation sets T301-T352 and each average power is generated by averaging the received power estimation values of the estimation set corresponding to the generated average power. It is noted that, since the estimation sets T301-T352 are one-to-one corresponding to the candidate locations 301-352 and the average powers are one-to-one corresponding to the estimation sets T301-T352, the average powers are also one-to-one corresponding to the candidate locations 301-352. After completing the step S500, in the step S502, values of a plurality of first weights being one-to-one corresponding to the estimation sets T301-T352 are decided in accordance with a sorting result obtained by sorting the average powers from high to low such that a maximum value set to the first weight corresponding to the candidate location with the highest average power is higher than the values set to the first weights corresponding to other candidate locations, a minimum value set to the first weight corresponding to the candidate location with the lowest average power is lower than the values set to the first weights corresponding to other candidate locations, and the values set to the first weights corresponding to the candidate locations with the average powers between the highest average power and the lowest average power are between the maximum value and the minimum value. Finally, in the step S504, the construction possibilities corresponding to the candidate locations could be determined in accordance with the first weights corresponding to the same candidate locations and the predicting sequence could be determined in accordance with the determined construction possibilities.

For example, when it is assumed that the average powers corresponding to the estimation sets T301-T352 are decreased as serial numbers of the estimation sets are increased, the first weights set by the solution provided by FIG. 5A would be in a decreasing trend from the estimation set T301 to the estimation set T352, that is, the first weight of the estimation set T301 is not less than the first weight of the estimation set T302-T352 since the serial number of the estimation set is increased from T301 to T302-T352. According to the assumption made above, the first weight of the estimation set T301 could be set to 52, the first weight of the estimation set T302 could be set to 51, the first weight of the estimation set T303 could be set to 50, and so on, and at last the first weight of the estimation set T352 could be set to 1. After setting the first weights of the estimation sets T301-T352, the construction probabilities could be determined in accordance with the first weights such that the predicting sequence could be generated accordingly. It is noted that, the construction probabilities could be determined by considering only the first weights or considering the first weights along with any other factors.

In the embodiment shown in FIG. 5A, the values of the first weights are affected only by the order of the sorted average powers but not values of the average powers. It is also noted that an adequate rule or artificial intelligence model could be used to generate the predicting sequence in accordance with the first weights. When the artificial intelligence model is going to be used for generating the predicting sequence, it can be trained in advance by having the first weights and the selected base location as training materials such that accuracy of predicting sequence generation in accordance with the first weights could be improved.

Figure 5B:
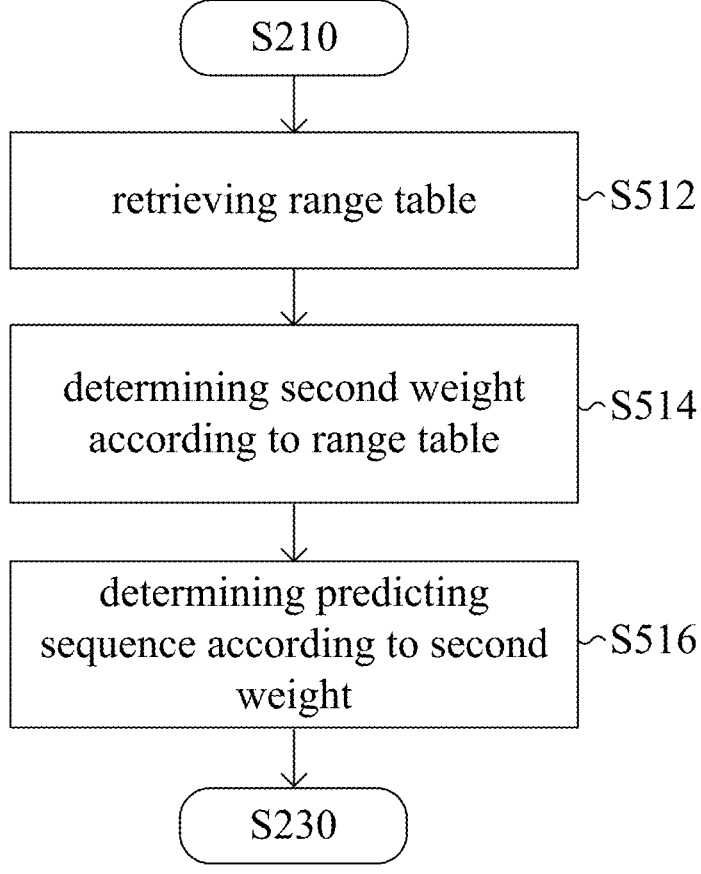
FIG. 5B is a flow chart showing determining construction probabilities of candidate locations in accordance with one embodiment of the present invention.

Please refer to FIG. 5B, which is a flow chart showing determining construction probabilities of candidate locations in accordance with one embodiment of the present invention. In this embodiment, a range table previously established is retrieved in the step S512. The range table in the embodiment comprises a plurality of data ranges and a plurality of weight adjustments corresponding to the data ranges, wherein each of the data ranges corresponds to one of the weight adjustments such as those shown in FIG. 6. Specifically, the range table is determined by all the received power estimation values obtained from the step S210 to divide the range covering the received power estimation values into several levels (such as 4 levels shown in FIG. 6) such that it is meaningful to adjust orders of the candidate locations within the predicting sequence by using the weight adjustments. For example, when the specific area 10 is so small that the received power estimation values are all within the range from −70 dbm to −90 dbm, it is less meaningful to leveling the received power estimation values by using the range table shown in FIG. 6 than by using another range table dividing the range from −70 dbm to −90 dbm into 4 or more levels because only two weight adjustments could be obtained by using the range table shown in FIG. 6 but 4 or more weight adjustments could be obtained by using the another range table. It is also noted that the number of levels into which the range covering all the received power estimation values is divided is not limited to a specific number, such as 4. In fact, the number of levels could be decided in accordance with actual needs.

After retrieving the range table, a judgement operation is performed for each of the estimation sets T301-T352 to obtain a corresponded second weight in the step S514. Similarly, because the estimation sets T301-T352 are one-to-one corresponding to the candidate locations 301-352 and the second weights are one-to-one corresponding to the estimation sets T301-T352, the second weights are also one-to-one corresponding to the candidate locations 301-352. After completing the step S514, the construction probabilities could be determined in accordance with the second weights and the predicting sequence could be generated accordingly in the step S516. In this embodiment, the judgement operation comprises retrieving, for each received power estimation value of the estimation set, a temporary adjustment corresponding to the received power estimation value, wherein the temporary adjustment is the weight adjustment to which the data range covering the received power estimation value is corresponded, and averaging the temporary adjustments corresponding to the received power estimation values of the same estimation set as the second weight corresponding to this estimation set. For example, when the five received power estimation values of the estimation set T301 are the received power estimation value P301_130 whose value is −75 dbm (decibel milliwatt), the received power estimation value P301_132 whose value is −85 dbm, the received power estimation value P301_134 whose value is −77 dbm, the received power estimation value P301_136 whose value is −82 dbm and the received power estimation value P301_138 whose value is −92 dbm, the temporary adjustments obtained from performing the judgement operation in accordance with the range table shown in FIG. 6 are 4, 3, 4, 3 and 2 corresponding to the received power estimation values P301_130, P301_132, P301_134, P301_136 and P301_138, respectively. Because the second weight corresponding to the estimation set T301 is the average of the temporary adjustments corresponding to the received power estimation values P301_130, P301_132, P301_134, P301_136 and P301_138, it could be easily obtained that the second weight corresponding to the estimation set T301 is 3.2, that is, (4+3+4+3+2)/5=3.2.

As understood by those skilled in the art, there are solutions for determining the predicting sequence other than the two solutions provided above. For example, the two solutions provided above can be applied together or some other solutions can be applied with the two solutions provided above to decide the predicting sequence. Furthermore, an adequate rule or artificial intelligence model could be used to generate the predicting sequence in accordance with the second weights. When the artificial intelligence model is going to be used for generating the predicting sequence in accordance with the second weights, it can be trained in advance by having the second weights and the selected base location as training materials such that accuracy of predicting sequence generation in accordance with the second weights could be improved.

Figure 5C:
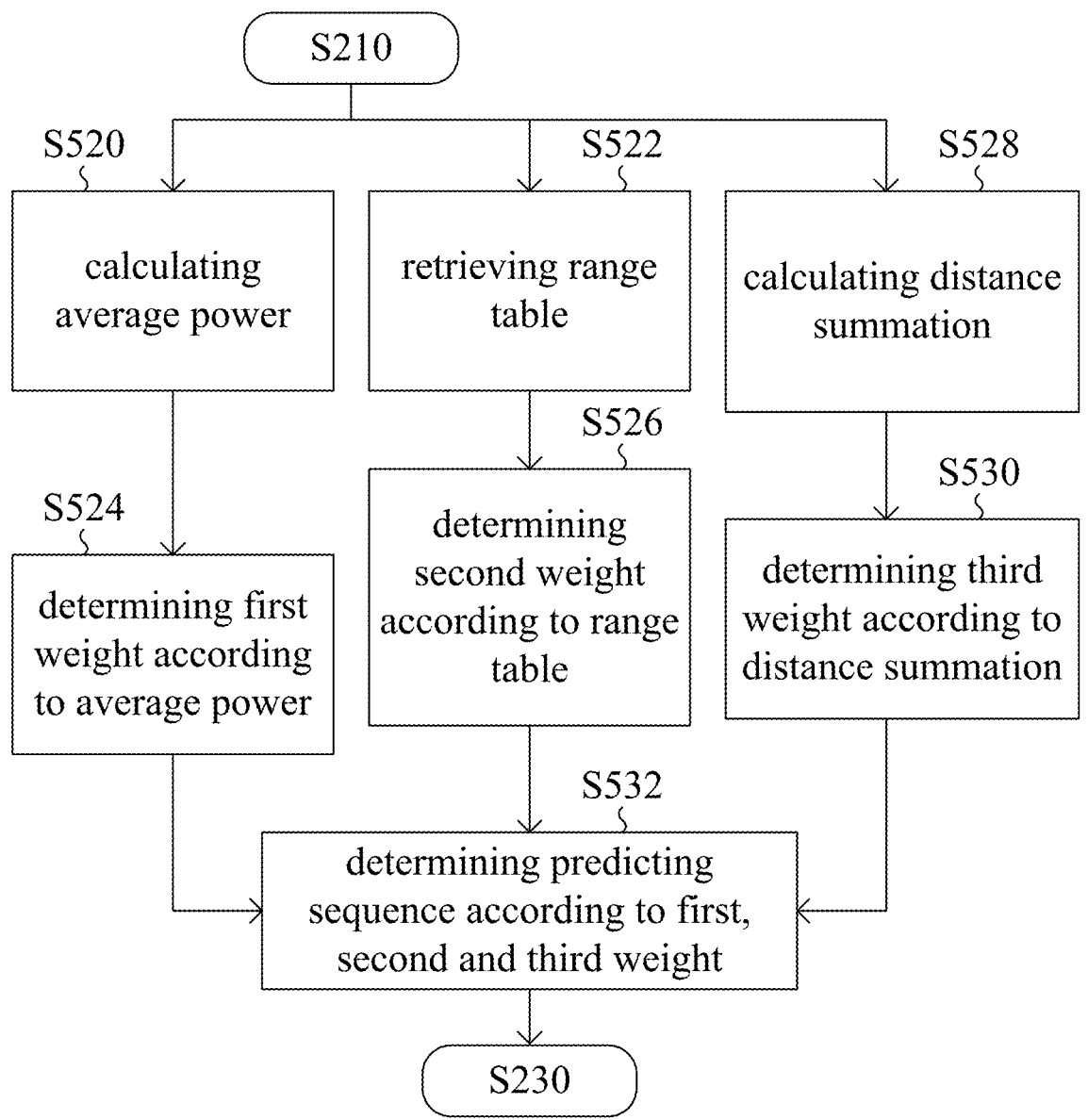
FIG. 5C is a flow chart showing determining construction probabilities of candidate locations in accordance with one embodiment of the present invention.

Please refer to FIG. 5C, which is a flow chart showing determining construction probabilities of candidate locations in accordance with one embodiment of the present invention. It is noted that detailed operations of the step S520 and S524 could be found by referring to the descriptions made for the steps S500 and S502 shown in FIG. 5A and the detailed operations of the step S522 and S526 could be found by referring to the descriptions made for the steps S512 and S514 shown in FIG. 5B. Therefore, the detailed descriptions of the steps S520-S526 are omitted here to shorten the descriptions of the present invention.

As shown in FIG. 5C, besides the steps S520-S524, the step S528 is further performed after completing the step S210. In the step S528, a plurality of distance summations are obtained, wherein each distance summation corresponds to a selected candidate location and is obtained by summing a plurality of distances between the user devices 130-138 and the selected candidate location. For example, the distance summation corresponding to the candidate location 301 is obtained by summing the distances each between the candidate location 301 and one of the user devices 130-138. After obtaining the distance summations corresponding to the candidate locations 301-352, a plurality of third weights can be determined in accordance with the obtained distance summations in the step S530. Different approaches could be used to determine the third weight corresponding to the candidate locations 301-352 in accordance with the distance summations in different embodiments, for example, the third weights could be determined in accordance with differences or ratios between the distance summations or could be determined in accordance with a result obtained by sorting the distance summations or levels into which the range covering the distance summations are divided.

It is understood by those skilled in the art that the third weights corresponding to the candidate locations 301-352 could be determined by applying other solutions besides the approaches provided above or by applying several solutions together. For example, because the signal quality becomes worse when the distance between the wireless network base station and the user device increases, sorting and leveling the distance summations could be applied together to set the third weights corresponding to the candidate locations within a preset range, such as the longest 20%, to a same value while set the third weights corresponding to other candidate locations to another value so that construction probabilities corresponding to the candidate locations with longer distance summation could be decreased.

It is noted that although an adequate rule could be used to generate the predicting sequence in accordance with several weights including but not limited to one of the first, second and third weights discussed above, defining the adequate rule using a plurality of weights would be time and man-power consuming. Therefore, the artificial intelligence is used in this embodiment to generate the predicting sequence. When the artificial intelligence model is going to be used for generating the predicting sequence, it can be trained in advance by having the first, second and third weights and the selected base location as training materials such that accuracy of predicting sequence generation in accordance with the first, second and third weights could be improved.

Please refer to FIG. 2 again. After generating the predicting sequence in the step S220 by using the solutions provided above or any other solutions known by those skilled in the art, the candidate locations with low construction probabilities can be omitted such that manpower and time cost for performing actual measuring operation in the omitted candidate locations can be saved, and the candidate locations with high construction probabilities are arranged, for example in order of values of the construction probabilities, to form a starting sequence comprising the locations in which the actual measuring operation is going to be performed in the step S230. An amount of the candidate locations listed in the starting sequence is referred to as a preset amount hereinafter, and the preset amount could be decided in accordance with actual needs and can be a specific value or a specific ratio, such as 30%, of the total amount of the candidate locations.

After building the starting sequence by the step S230, the actual measuring operation could be performed in accordance with the starting sequence in the step S240. In other words, the actual measuring operation would not be performed in the candidate locations not listed in the starting sequence. Therefore, the actual measuring operation is only performed in the candidate locations listed in the starting sequence, and a measurement result obtained by performing the actual measuring operation is used for deciding the base location in the step S250. Accordingly, because the actual measuring operation is not going to be performed in the locations which are analyzed to be with poor signal qualities as described above, manpower and time cost for performing actual measuring operation in these poor-signal-quality locations is saved accordingly.

It is noted that, in the embodiments described above, the base location is decided in accordance with the physical quantities, such as strength of electromagnetic wave, obtained from the actual measuring operation. However, because it is common that differences between the measured results and the theoretical values estimated by the propagation models are existed, some extra operations could be added into the embodiments described below to reduce the problem of omitting the candidate locations due to the differences between the measured results and the theoretical values and the actual measuring operation performed in the step S240 would be more complicated by doing so.

In order to solve the problem described above, a SINR (Signal to Interference plus Noise Ratio) threshold determination operation which comprises a series of operations including measuring the SINR is performed before performing the actual measuring operation in the step S240 in one embodiment of the present invention in order to find out the candidate locations having good wireless signal strength but having not been listed in the starting sequence and to omit the candidate locations, which may have poor wireless signal strength, from the starting sequence.

Figure 7:
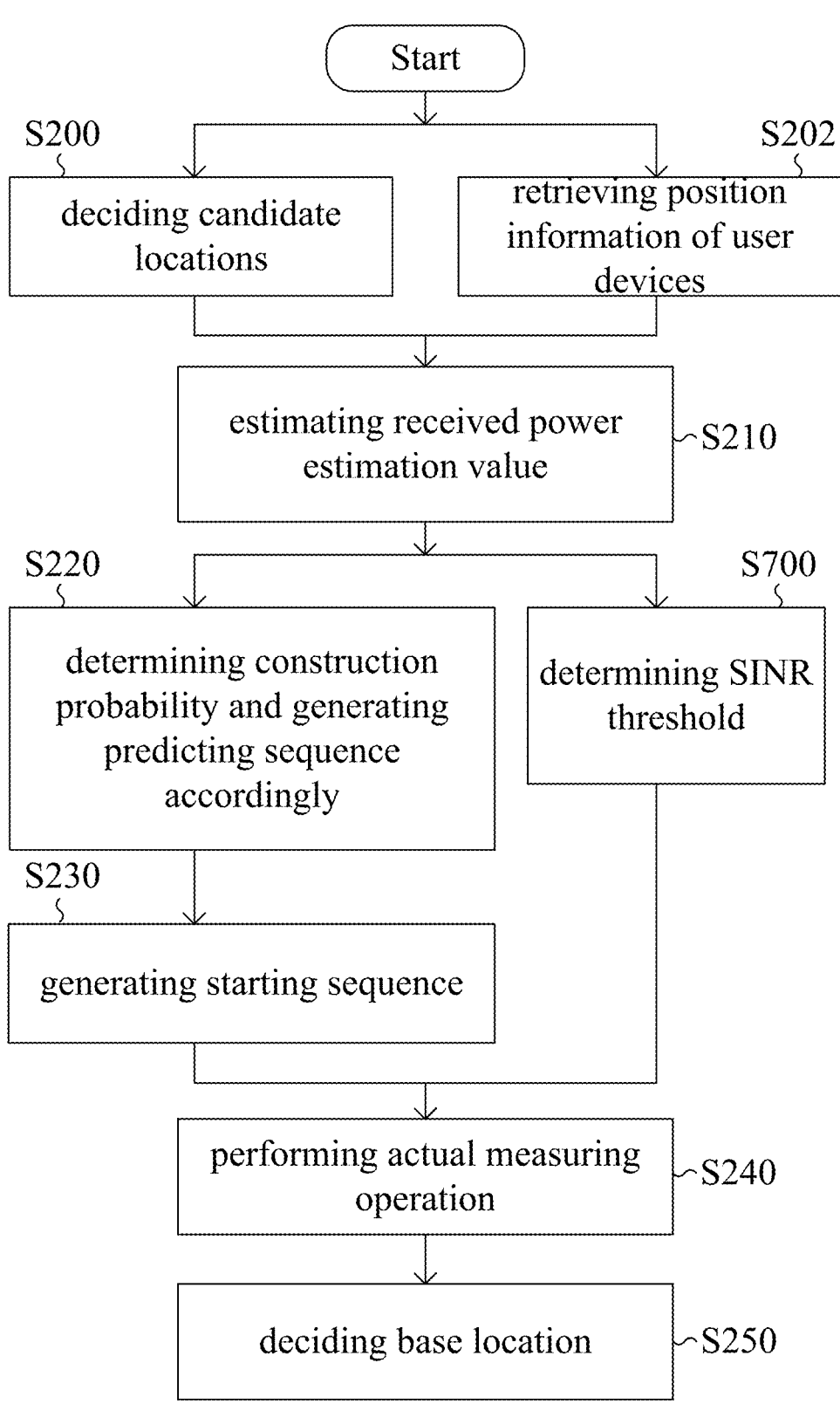
FIG. 7 is a flow chart of the method for determining location of wireless network base station in accordance with one embodiment of the present invention.

Please refer to FIG. 7, which is a flow chart of the method for determining location of wireless network base station in accordance with one embodiment of the present invention, wherein the detailed operations relating to the steps S200-S230 could be found in the descriptions made for FIG. 2 and are not repeated here. In this embodiment, after obtaining the received power estimation values as shown in FIG. 4 in the step S210, a SINR threshold is determined in accordance with the received power estimation value in the step S700. The detailed operation of the step S700 is the SINR threshold determination operation mentioned above, and the SINR threshold determined by the SINR threshold determination operation will be used in the actual measuring operation performed in the step S240.

Figure 8:
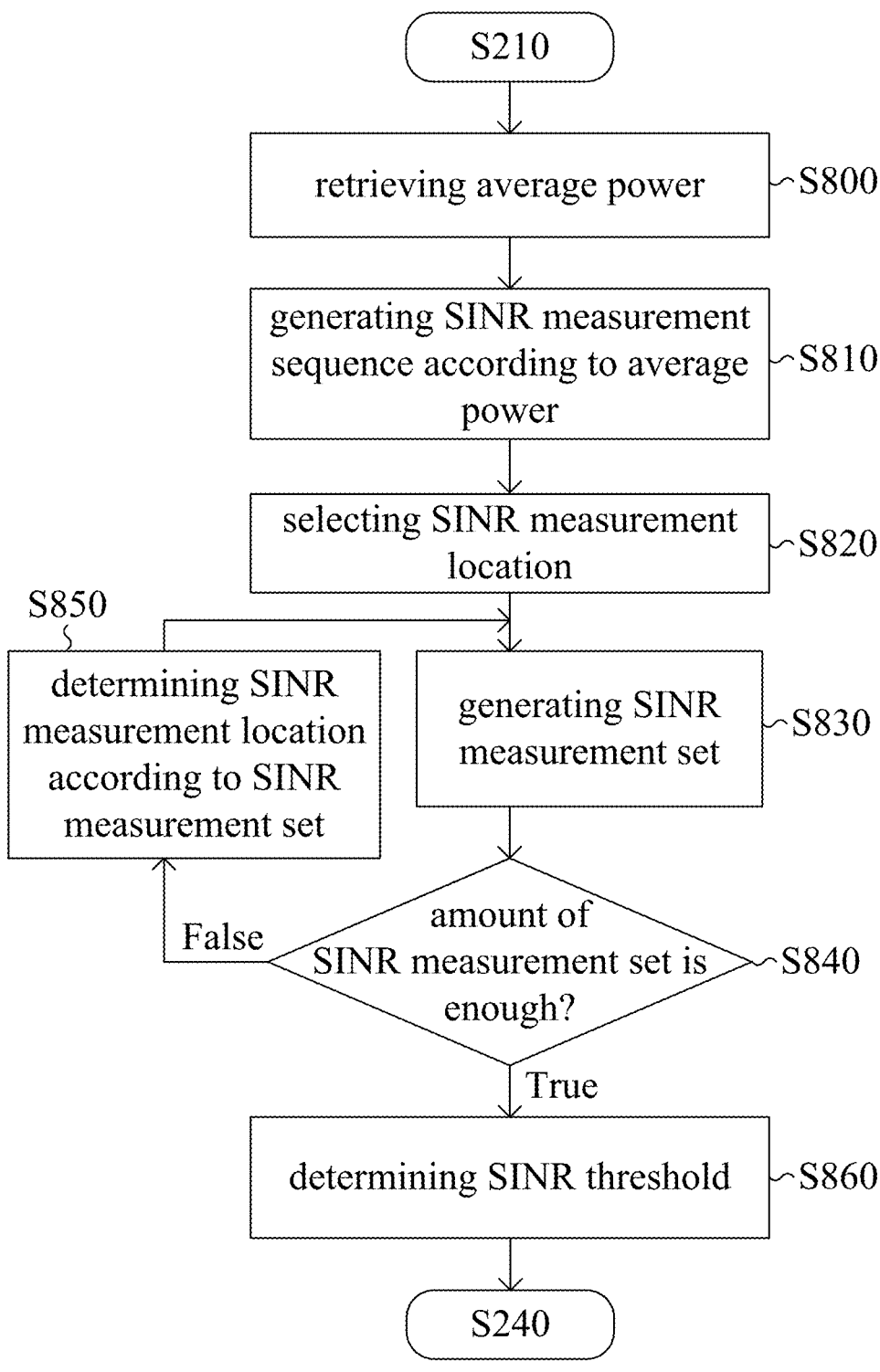
FIG. 8 is a flow chart of SINR threshold determination operation in accordance with one embodiment of the present invention.

Please refer to FIG. 8, which is a flow chart of SINR threshold determination operation in accordance with one embodiment of the present invention. In this embodiment, the average power corresponding to each one of the estimation sets in accordance with the received power estimation values obtained in the step S210 is calculated in the step S800. It is understood by those skilled in the art that operations performed in the step S800 could be the same as those performed in the step S500 or S520 described above. Therefore, when the embodiment shown in FIG. 8 is applied with one of the embodiments shown in FIG. 5A or FIG. 5C, the average power could be retrieved from results generated by the step S500 or S520 instead of calculating again in step S800.

After obtaining the average powers each of which corresponds to one of all the estimation sets, a SINR measurement sequence is obtained in the step S810 by firstly sorting the average powers from high to low to obtain a sorting result which is also referred to as a first sequence hereinafter, and then arranging the estimation set in accordance with an order of the average powers corresponded thereto arranged in the first sequence to obtain a second sequence, and finally arranging the candidate locations in accordance with an order of the estimation sets corresponded thereto arranged in the second sequence to obtain the SINR measurement sequence.

After obtaining the SINR measurement sequence, a SINR measurement location in which the SINR measurement operation is performed is selected in the step S820. In this embodiment, a candidate location for which the SINR measurement operation is going to be performed is selected from the SINR measurement sequence, wherein the selected candidate location is used as a SINR measurement location in which the SINR measurement operation is performed. Specifically, the operation for selecting SINR measurement location from the SINR measurement sequence is to select a first one of the candidate locations in which the SINR measurement operation has not been performed from beginning of the SINR measurement sequence. For example, when the candidate location 301 is arranged in the beginning of the SINR measurement sequence and the SINR measurement operation has not been performed in the candidate location 301, the candidate location 301 is selected as the SINR measurement location such that the SINR measurement operation will be performed therein. In another example, when the candidate location 301 and 352 are arranged as the first one and second one of the SINR measurement sequence, respectively, and the SINR measurement operation has been performed in the candidate location 301 but has not been performed in the candidate location 352, it is the candidate location 352 but not the candidate location 301 to be selected as the SINR measurement location.

After selecting a SINR measurement location in the step S820, technicians can perform the SINR measurement operation in the SINR measurement location and record results obtained from performing the SINR measurement operation in the SINR measurement location as a SINR measurement set corresponding to the SINR measurement location in the step S830. Continuing with the embodiment used while explaining FIG. 1, signal emitters can be set in the places where the user devices 130-138 are or the user devices 130-138 are turned on so that signals can be emitted from the locations where the user devices 130-138 are. Accordingly, a plurality of SINR values can be measured in the SINR measurement location, wherein each SINR value corresponds to one of the user devices 130-138 and is measured from the wireless signal emitted from the place where the corresponded user device is. The SINR values measured in a same SINR measurement location and the user devices corresponding to the measured SINR values are grouped to form the SINR measurement set corresponding to the SINR measurement location under measuring. Please refer to FIG. 9, which is a schematic diagram showing contents of a plurality of SINR measurement sets in accordance with one embodiment of the present invention. As shown in FIG. 9, in order to describe the technique solutions easily, the SINR values measured from the signals emitted from the user devices 130-138 respectively in the candidate location 301 would be referred to as the SINR value SINR301_130, the SINR value SINR301_132, the SINR value SINR301_134, the SINR value SINR301_136 and the SINR value SINR301_138, and the SINR measurement set having the SINR values SINR301_130-SINR301_138 is referred to as the SINR measurement set SINR301.

Because it costs a lot of manpower to perform the measurement operations, a first preset amount of candidate locations for which the SINR measurement operation is performed are selected by a specific way, such as taking 20% of the amount of the candidate locations as the first preset amount, in this embodiment. Therefore, the SINR measurement operation is not performed in all the candidate locations. It is noted that the preset amount is not limited to that mentioned in the embodiments but can be adjusted in accordance with actual needs.

Please refer to FIG. 8 again. After completing the SINR measurement operation and the SINR measurement set recording each time in the step S830, it is determined that whether an amount of the recorded SINR measurement sets is equal to the first preset amount in the step S840. When the amount of the recorded SINR measurement sets is less than the first preset amount, a newly selected SINR measurement location in which the SINR measurement operation is going to be performed next is determined in accordance with the SINR measurement set being recorded just now in the step

S850; on the contrary, when the amount of the recorded SINR measurement sets is equal to the first preset amount, the SINR threshold can be determined in accordance with all the recorded SINR measurement sets in the step S860. In one embodiment, operations are performed in the step S860 such that, for each SINR measurement set, a lowest one of the SINR values in the SINR measurement set is selected as a lowest SINR value corresponding to the SINR measurement set, and, after selecting the lowest SINR values corresponding to all the SINR measurement set respectively, one of the lowest SINR values is taken as the SINR threshold. Furthermore, there are a plurality of approaches to select the SINR threshold from the lowest SINR values. For example, one with lowest value in the lowest SINR values can be selected as the SINR threshold directly. In another example, one at a specific ranking of the lowest SINR values, such as there are 50% or 80% of the lowest SINR values being higher than the ranked one, can be selected as the SINR threshold value.

It is noted that the solution provided in the step S850 is not the only approach to determine the newly selected SINR measurement location. For example, anyone of the candidate locations arranged after the SINR measurement location in the SINR measurement sequence can be selected as the newly selected SINR measurement location. Or, in another example, although the newly selected SINR measurement location is determined in accordance with the SINR measurement set recorded just now as proposed in the step S850, the ways in which the SINR measurement set are applied to determine the newly selected measurement location are not limited. In one embodiment, the SINR measurement set recorded just now can be used to be compared with other recorded SINR measurement sets and the newly selected SINR measurement location is determined in accordance with a result generated by the comparison.

Figure 10:
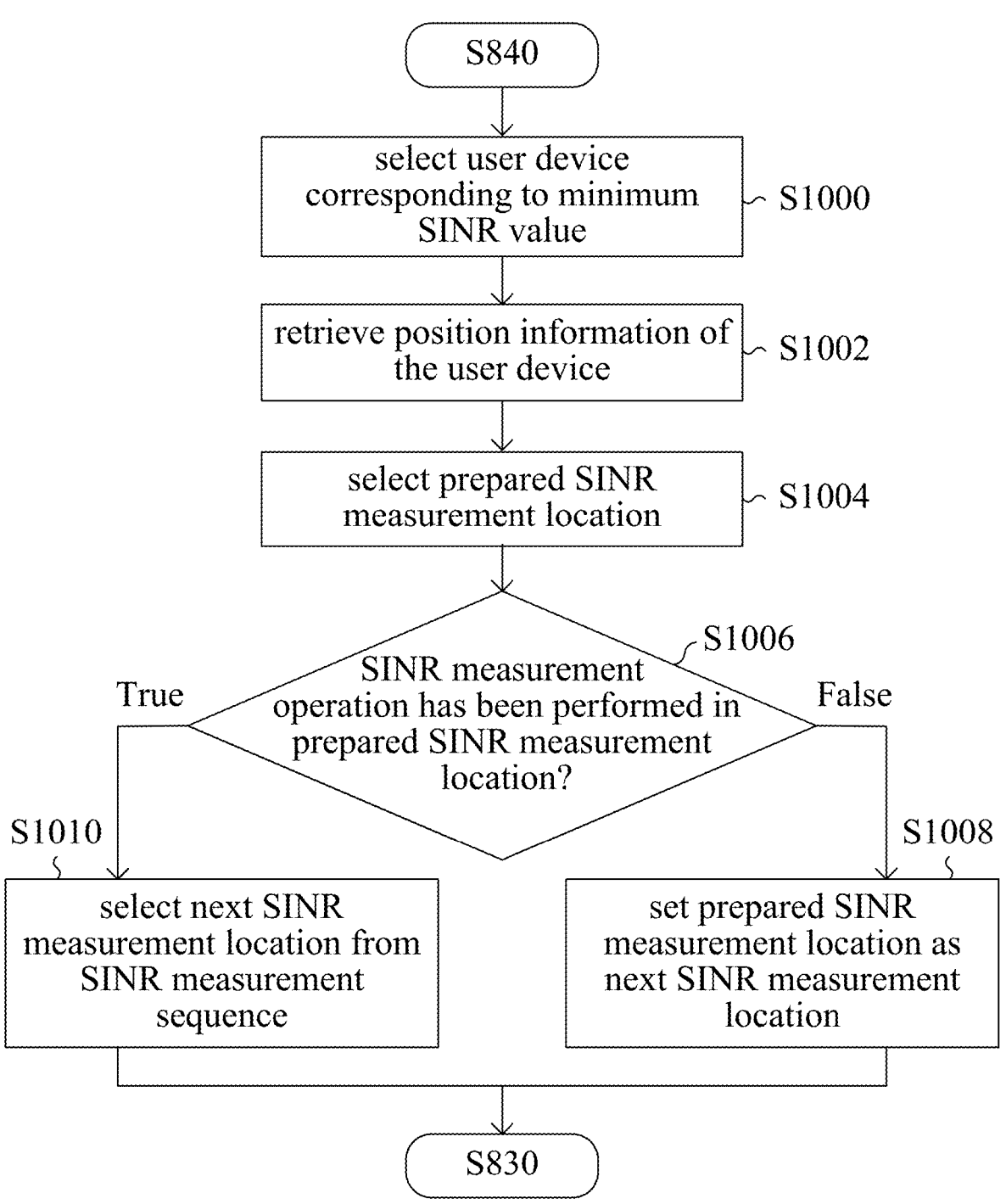
FIG. 10 is a flow chart showing detailed operation of the step S850 in accordance with one embodiment of the present invention.

Please refer to FIG. 10, which is a flow chart showing detailed operation of the step S850 in accordance with one embodiment of the present invention. As shown in the figure, when it is determined that the amount of the SINR measurement set is less than the first preset amount in the step S840, the user device corresponding to the lowest SINR value in the SINR measurement set recorded just now for the SINR measurement location at present is selected in the step S1000. For example, when the SINR measurement location at present is the candidate location 324 and the SINR measurement set SINR324 recorded for the candidate location 324 comprises the SINR value SINR324_130 whose value is 26.88, the SINR value SINR324_132 whose value is 8.27, the SINR value SINR324_134 whose value is 11.1, the SINR value SINR324_136 whose value is 21.24, and the SINR value SINR324_138 whose value is 21.55, the user device 132 corresponding to the lowest SINR value, which is the SINR value SINR324_132 in this embodiment, would be selected in this step.

After selecting the user device in the step S1000, the position information of the selected user device is obtained in the step S1002 in order to assist the determination of the newly selected SINR measurement location. In the step S1004, the position information of the selected user device is compared with the position information of the SINR measurement location at present and one of the candidate locations which are closer to the selected user device than the SINR measurement location at present is, is selected in accordance with a comparison result obtained by comparing the two position information. In order to clearly explain the technique solutions provided by the present invention, the selected candidate location, which is closer to the selected user device than the SINR measurement location at present is, is referred to as a prepared SINR measurement location hereinafter.

In the step S1004, a plurality of approaches could be applied to select the prepared SINR measurement location in accordance with the position information of the selected user device and the SINR measurement location at present. For example, the prepared SINR measurement location could be anyone of the candidate locations which are passed during moving from the SINR measurement location at present to the selected user device. In another example, the prepared SINR measurement location can be selected by using the solution provided by FIG. 11 or any other proper solutions.

Figure 11:
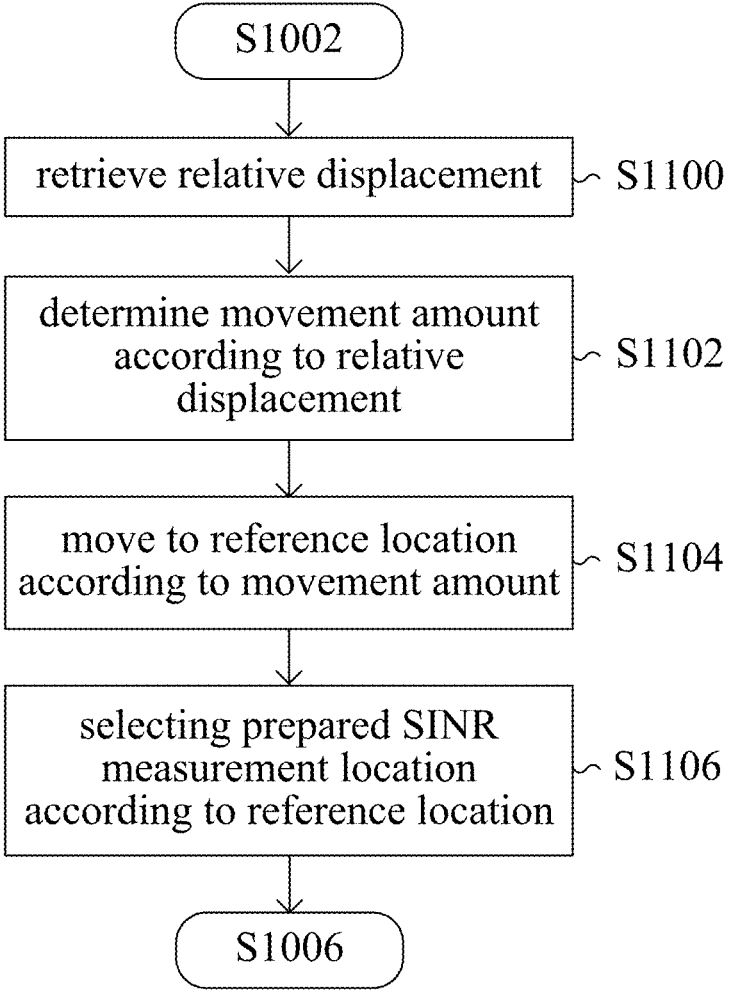
FIG. 11 is a flow chart showing detailed operation of the step S1004 in accordance with one embodiment of the present invention.

Please refer to FIG. 11, which is a flow chart showing detailed operation of the step S1004 in accordance with one embodiment of the present invention. In this embodiment, the position information of the user device selected by performing the step S1004 is compared with the position information of the SINR measurement location at present to obtain distance and angle differentials therebetween in the step S1100. It is noted that the distance and angle differentials between the selected user device and the SINR measurement location at present could be collected as the relative displacement between the selected user device and the SINR measurement location at present. Continuing with the embodiment used to explain FIG. 10, it is assumed that the position information of the user device 132 obtained in the step S1002 comprises a X-axis coordinate value 415 and a Y-axis coordinate value 1460 and the position information of the candidate location 324, which is the SINR measurement location at present in this embodiment, comprises a X-axis coordinate 1100 and a Y-axis coordinate value 1366, so that the relative displacement between the user device 132 and the candidate location 324 comprises a X-axis displacement −685 and a Y-axis displacement 94.

After obtaining the relative displacement between the selected user device and the SINR measurement location at present, a movement amount, which comprises distance and direction away from the SINR measurement location, is determined in accordance with the obtained relative displacement in the step S1102. The determination of movement amount can be performed in several different ways. For example, the relative displacement could be taken as the movement amount directly and anyone of the candidate locations passed during moving away from the SINR measurement location at present with the movement amount can be selected as the newly selected SINR measurement location. In some other examples, the movement amount could be a ratio of the relative displacement, such as 25% of the relative displacement. Continuing with the embodiment discussing the user device 132 and the candidate location 324, because the relative displacement therebetween comprises the X-axis displacement −685 and the Y-axis displacement 94, the movement amount would comprise a X-axis displacement −171.25 and a Y-axis displacement 23.5 since it is obtained by scaling the relative displacement down to 25%.

After obtaining the movement amount, a reference position can be reached by moving away from the SINR measurement location at present with the movement amount in the step S1104. For the embodiment discussed above, the reference position can be reached by moving −171.25 unit length along the X-axis and 23.5 unit length along the Y-axis from the candidate location 324. Therefore, the position information of the reference position comprises a X-axis coordinate value 928.75 and a Y-axis coordinate value 1389.5. Because the position information of the reference position might not be the same as the position information of any candidate location, a candidate location which is nearest to the reference position can be taken as the prepared SINR measurement location in the step S1106.

Please refer to FIG. 10 again. After deciding the prepared SINR measurement location by applying any solutions, the flow goes into the step S1006 to determine whether the SINR measurement operation has been performed in the prepared SINR measurement location. When it is determined that the SINR measurement operation has not been performed in the prepared SINR measurement location, the prepared SINR measurement location could be used as the newly selected SINR measurement location, i.e., the SINR measurement location at present would be replaced by the prepared SINR measurement location in the step S1008. On the contrary, when it is determined that the SINR measurement operation has been performed in the prepared SINR measurement location, the prepared SINR measurement location is abandoned and the first one of the candidate locations, which are arranged in the SINR measurement sequence and have not been processed by the SINR measurement operation, is taken as the newly selected SINR measurement location in the step S1010.

It is noted that the detailed operation of the step S1010 is similar to that provided in the embodiment explaining the step S820 so that, when the present embodiment and the embodiment explaining the step S820 are applied together, the flow could go to the step S820 to obtain the newly selected SINR measurement location from the SINR measurement sequence when it is determined in the step S1006 that the prepared SINR measurement operation has been performed in the prepared SINR measurement location.

Please refer to FIG. 7 again. The detailed operation of the step S700 are described by the technique solutions provided above along with FIG. 8-11. As described above, the SINR threshold decided in the step S700 could be applied in the actual measuring operation performed in the step S240. In order to use the SINR threshold decided by the step S700 in the step S240, the actual measuring operation performed in the step S240 in accordance with the starting sequence can be accomplished by referring to the descriptions made below along with FIG. 12.

Figure 12:
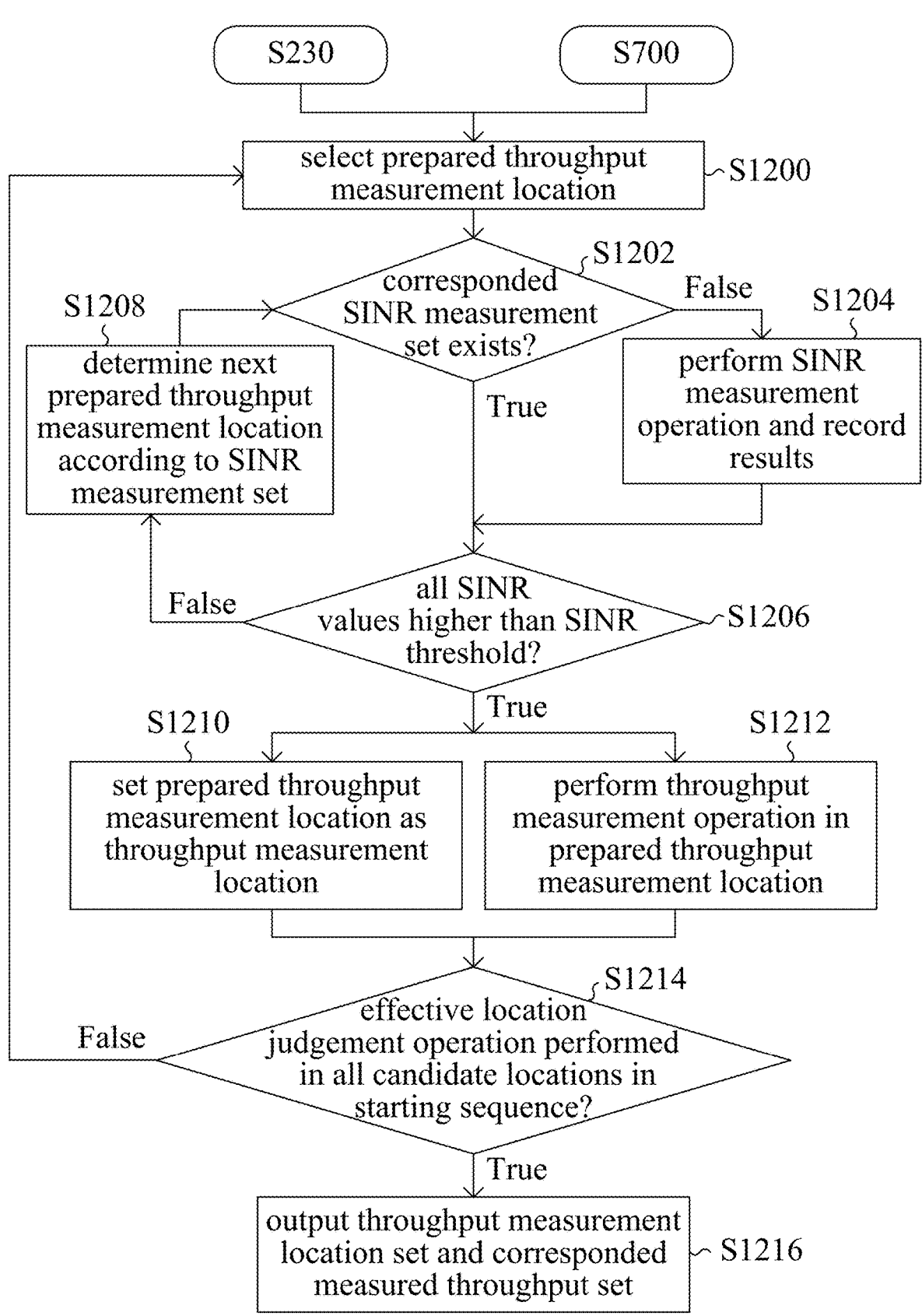
FIG. 12 is a flow chart showing detailed operation of the step S240 in accordance with one embodiment of the present invention.

Please refer to FIG. 12, which is a flow chart showing detailed operation of the step S240 in accordance with one embodiment of the present invention. In this embodiment, the step S1200 is performed to inspect the starting sequence such that a first one of the candidate locations, for which an effective location judgement operation has not been performed, in the starting sequence is selected as a prepared throughput measurement location of which a data throughput is going to be measured. After completing the selection of the prepared throughput measurement location performed in the step S1200, it is determined in the step S1202 that whether the SINR measurement set corresponding to the prepared throughput measurement location exists. Since the SINR values corresponding to some of the candidate locations are recorded through the operations performed previously, a result of the determination operation performed in the step S1202 could be easily obtained by determining whether the candidate location selected as the prepared throughput measurement location is recorded in the recorded data.

When the result of the determination operation performed in the step S1202 is false, that is, none of the SINR measurement sets is found to be corresponded to the prepared throughput measurement location, the flow goes to the step S1204 to perform the SINR measurement operation described in the step S830 and record the measured result as the SINR measurement set corresponding to the prepared throughput measurement location. After obtaining the SINR measurement set corresponding to the prepared throughput measurement location, the flow goes to the step S1206. On the contrary, when the result of the determination operation performed in the step S1202 is true, that is, there exists the SINR measurement set corresponding to the prepared throughput measurement location, the flow goes to the step S1206 directly.

Those performed in the step S1206 is the effective location judgement operation mentioned above. In the step S1206, each one of the SINR values of the SINR measurement set corresponding to the prepared throughput measurement location is compared with the SINR threshold obtained previously in order to determine whether everyone of the SINR values of the SINR measurement set corresponding to the prepared throughput measurement location is higher than the SINR threshold. When the result of the determination performed in the step S1206 is true, that is, all the SINR values in this SINR measurement set are higher than the SINR threshold, the prepared throughput measurement location is set to a throughput measurement location comprised in a throughput measurement location set in the step S1210, wherein a throughput measurement operation is going to be performed in the throughput measurement location. In the step S1212, the throughput measurement operation is performed in the throughput measurement location, and a result of the performed throughput measurement operation is stored as a measured throughput set corresponding to this throughput measurement location. After completing the step S1210 and the step S1212, the flow goes to the step S1214 to determine whether the effective location judgement has been performed for all the candidate locations arranged in the starting sequence. When a result of the determination performed in the step S1214 is false, the flow goes to the step S1200 to deal with next throughput measurement location. On the contrary, when the result of the determination performed in the step S1214 is true, the flow goes to the step S1216 to output the throughput measurement location set and all the measured throughput sets each corresponding to one of the throughput measurement locations comprised in the throughput measurement location set, such that the measurement results of the actual measuring operation, which includes the throughput measurement operation, could be used while deciding the base location.

In another aspect, when the result of the determination performed in the step S1206 is false, that is, at least one of the SINR value is not higher than the SINR threshold, it is determined that the prepared throughput measurement should not be comprised in the throughput measurement location set in this embodiment because of poor wireless connectivity. Accordingly, the flow goes to step S1208 to look for another prepared throughput measurement location. It is noted that many different solutions could be adopted to accomplish the operation for determining the prepared throughput measurement location. For example, anyone of the candidate locations arranged in the starting sequence and behind the prepared throughput measurement location at present can be selected as a next prepared throughput measurement location. In another example, other solutions such as the solution provided in FIG. 13 can be adopted to accomplish the operation for determining the next prepared throughput measurement location in accordance with the SINR measurement set corresponding to the prepared throughput measurement location.

Figure 13:
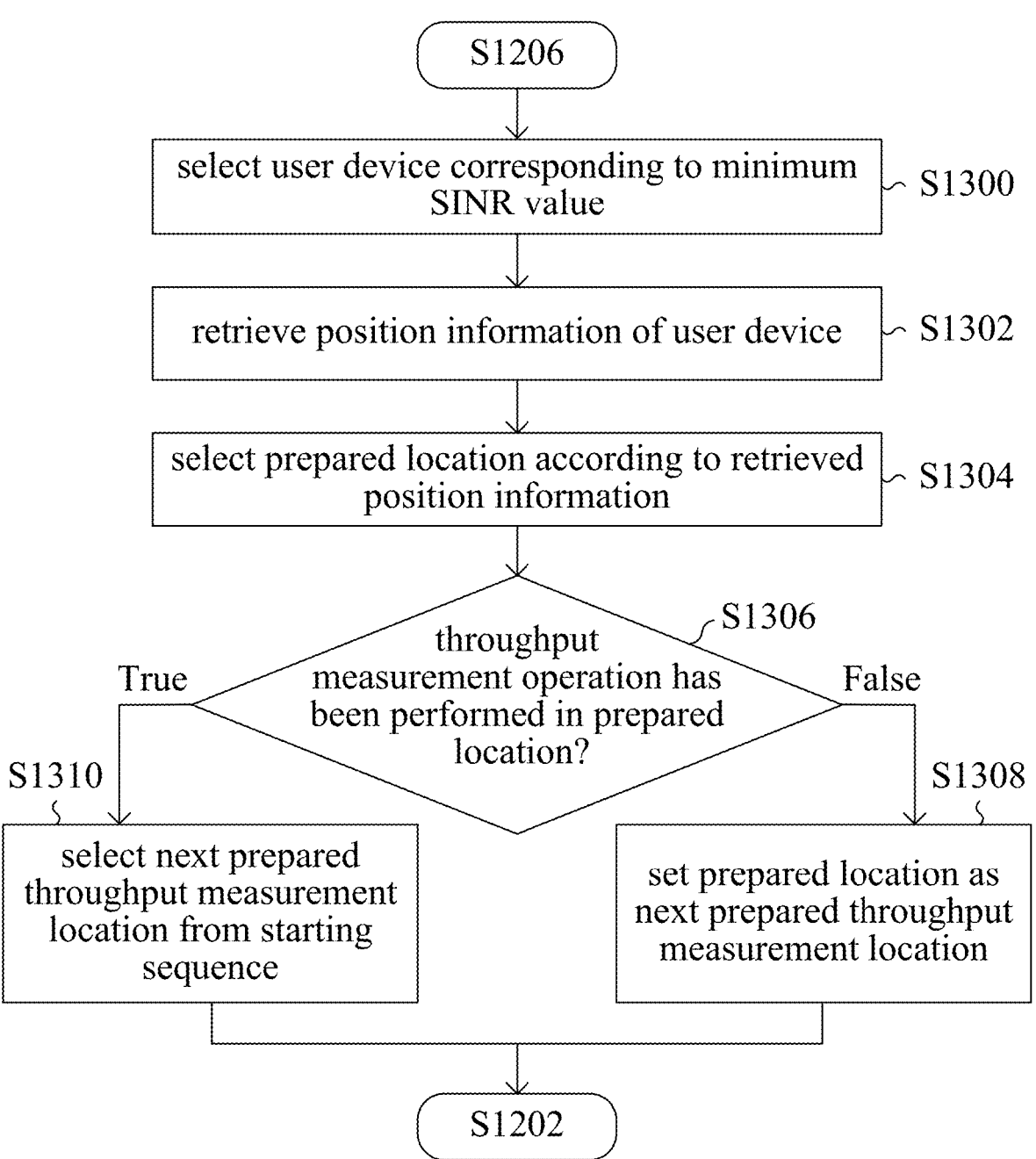
FIG. 13 is a flow chart showing detailed operation of the step S1208 in accordance with one embodiment of the present invention.

Please refer to FIG. 13, which is a flow chart showing detailed operation of the step S1208 in accordance with one embodiment of the present invention. As shown in the figure, when a result of the determination performed in the step S1206 is false, the user device corresponding to the lowest SINR value of the SINR measurement set corresponding to the prepared throughput measurement location at present is selected in the step S1300. In one embodiment, when the prepared throughput measurement location at present is the candidate location 324 and the SINR measurement SINR324 corresponded thereto comprises the the SINR value SINR324_130 whose value is 26.88, the SINR value SINR324_132 whose value is 8.27, the SINR value SINR324_134 whose value is 11.1, the SINR value SINR324_136 whose value is 21.24, and the SINR value SINR324_138 whose value is 21.55, the user device 132 corresponding to the lowest SINR value, which is the SINR value SINR324_132 in this embodiment, would be selected in this step.

After selecting the user device 132 in the step S1300, the position information of the user device 132 is retrieved in the step S1302 to assist determination of next prepared throughput measurement location. In the step S1304, the position information of the user device 132 is compared with the position information of the prepared throughput measurement location, and one of the candidate locations 301-352, which is closer to the user device 132 than the prepared throughput measurement location at present is, is selected as a prepared location in accordance with the result of this comparison.

Various solutions can be applied in the step S1304 to select the prepared location in accordance with the position information of the selected user device and the prepared throughput measurement location at present. For example, the prepared location could be anyone of the candidate locations which is passed during moving from the prepared throughput measurement location at present to the selected user device. In another example, other solutions such as the solution provided in FIG. 14 can be adopted to select the prepared location.

Figure 14:
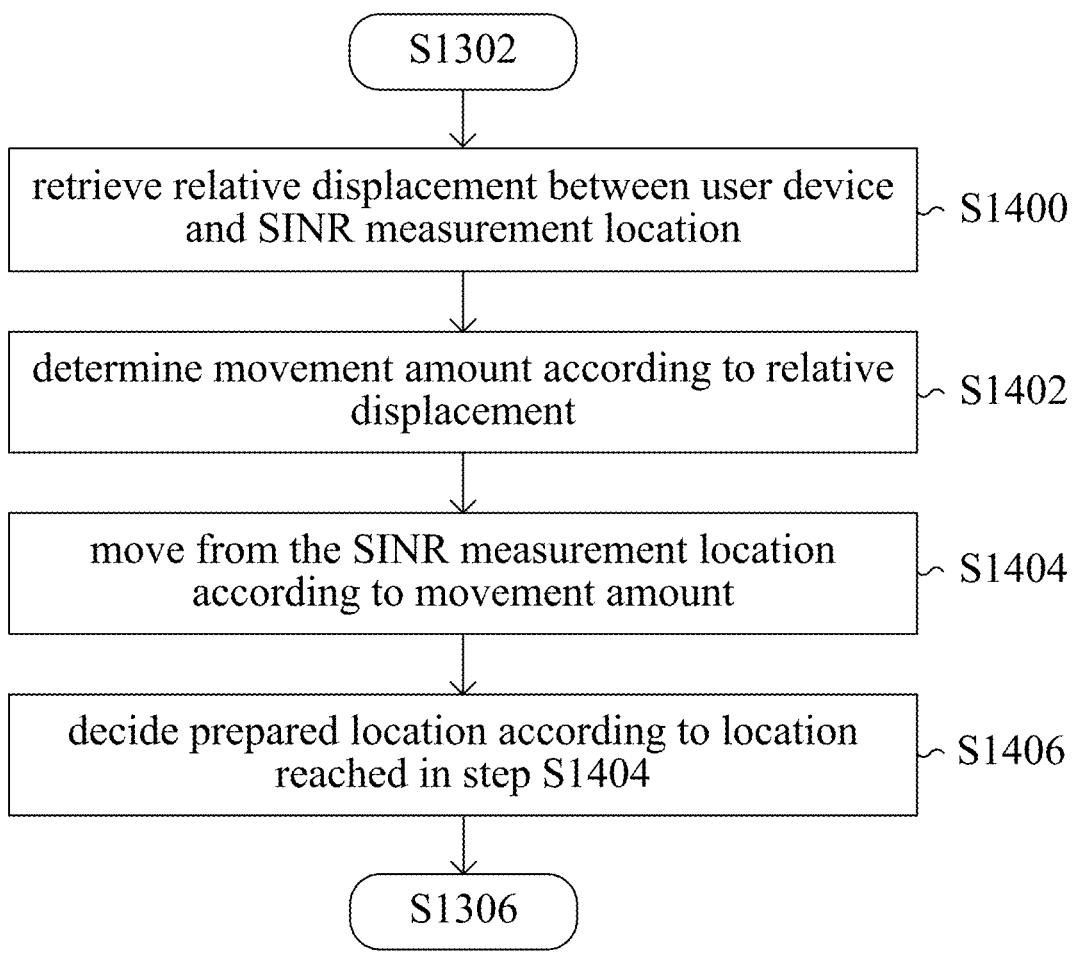
FIG. 14 is a flow chart showing detailed operation of the step S1304 in accordance with one embodiment of the present invention.

Please also refer to FIG. 14, which is a flow chart showing detailed operation of the step S1304 in accordance with one embodiment of the present invention. In this embodiment, the relative displacement can be obtained in the step S1400 by comparing the position information of the user device 132 and the prepared throughput measurement location at present. After obtaining the relative displacement, the movement amount from the prepared throughput measurement location at present could be determined in the step S1402 in accordance with the relative displacement. The determination of movement amount can be performed in several different ways. For example, the relative displacement could be taken as the movement amount directly. In some other examples, the movement amount could be a ratio of the relative displacement. After obtaining the movement amount, the prepared location can be anyone of the candidate locations passed during moving from the prepared throughput measurement location at present for the movement amount in some embodiments. In this embodiment, the candidate location nearest to a location reached by moving from the prepared throughput measurement location at present for the movement amount is selected to be the prepared location in the steps S1404-S1406.

Please refer to FIG. 13 again. By applying the solutions provided above, the prepared location can be easily obtained in the step S1304. After that, it is determined in the step S1306 that whether the throughput measurement operation has been performed in the prepared location. When the throughput measurement operation has not been performed in the prepared location, the flow goes to the step S1308 to replace the prepared throughput measurement location at current by the prepared location in the first and then goes to the step S1202 shown in FIG. 12. On the contrary, when the throughput measurement operation has been performed in the prepared location, the prepared location is abandoned, and the flow goes to the step S1310 to select the first one of the candidate locations, which are arranged in the starting sequence and have not been processed by the effective location judgement operation, as the next prepared throughput measurement location. Finally, the flow also goes to the step S1202 shown in FIG. 12. It is noted that since operations performed in the step S1310 is similar to those performed in the step S1200, the flow could go to step S1200 when it is determined in the step S1306 that the throughput measurement operation has been performed in the prepared location.

According to the technique solutions provided in FIG. 7-14, it can be known that the candidate locations which are listed in the starting sequence but failed to pass the determination made in the effective location judgement operation could not be listed in the throughput measurement location set. However, the candidate locations which are not listed in the starting sequence but passes the determination made in the effective location judgement operation while being selected as the prepared locations are listed in the throughput measurement location set. Furthermore, the candidate location within the throughput measurement location set could be sorted in order of summation of measured throughput corresponding to a same one candidate location in some embodiments.

It is believed that those with ordinary skill in the art could understand how to find out the candidate locations which are not listed in the starting sequence but with good wireless signal strength and omit the candidate locations which are listed in the starting sequence but with poor wireless signal strength by applying the SINR threshold determination operation described above. The candidate locations comprised in the throughput measurement location set and the measured throughputs corresponding to all the candidate locations in the throughput measurement location set are recorded as data to which are referenced while deciding the base location.

Furthermore, although the candidate locations listed in the throughput measurement location set are with certain wireless connectivity, an approach to increase the amount of the candidate locations qualified to be selected as the base location is further proposed in the present invention to increase accuracy of base location selection.

Figure 15:
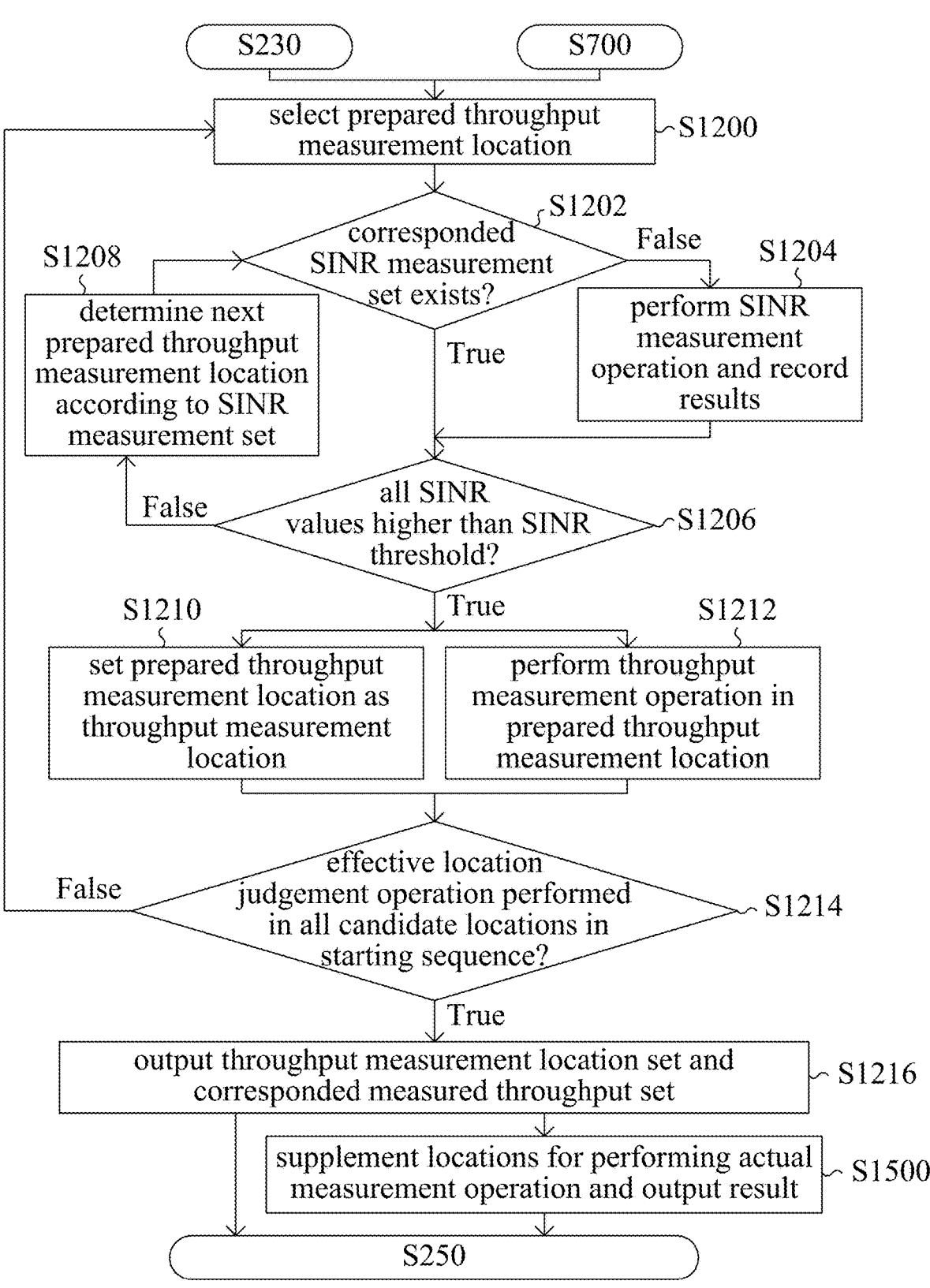
FIG. 15 is a flow chart showing detailed operation of the step S240 in accordance with one embodiment of the present invention.

Please refer to FIG. 15, which is a flow chart showing detailed operation of the step S240 in accordance with one embodiment of the present invention. In this embodiment, the steps performing operations the same as those performed in the steps shown in FIG. 12 are marked with the same labels as those used in FIG. 12 and are not described again here. As shown in FIG. 15, after outputting all results obtained by actual measuring which includes the throughput measurement location set and the measured throughput sets corresponding to each throughput measurement location in the throughput measurement location set respectively, operations are performed in the step S1500 such that the throughput measurement location set and measured throughput set are used to supplement the candidate locations in which the actual measuring operation should be performed. The measured results obtained by performing the actual measuring operation in the supplemented candidate locations are also output in the step S1500 as data to which are referenced while deciding the base location in the step S250.

Figure 16:
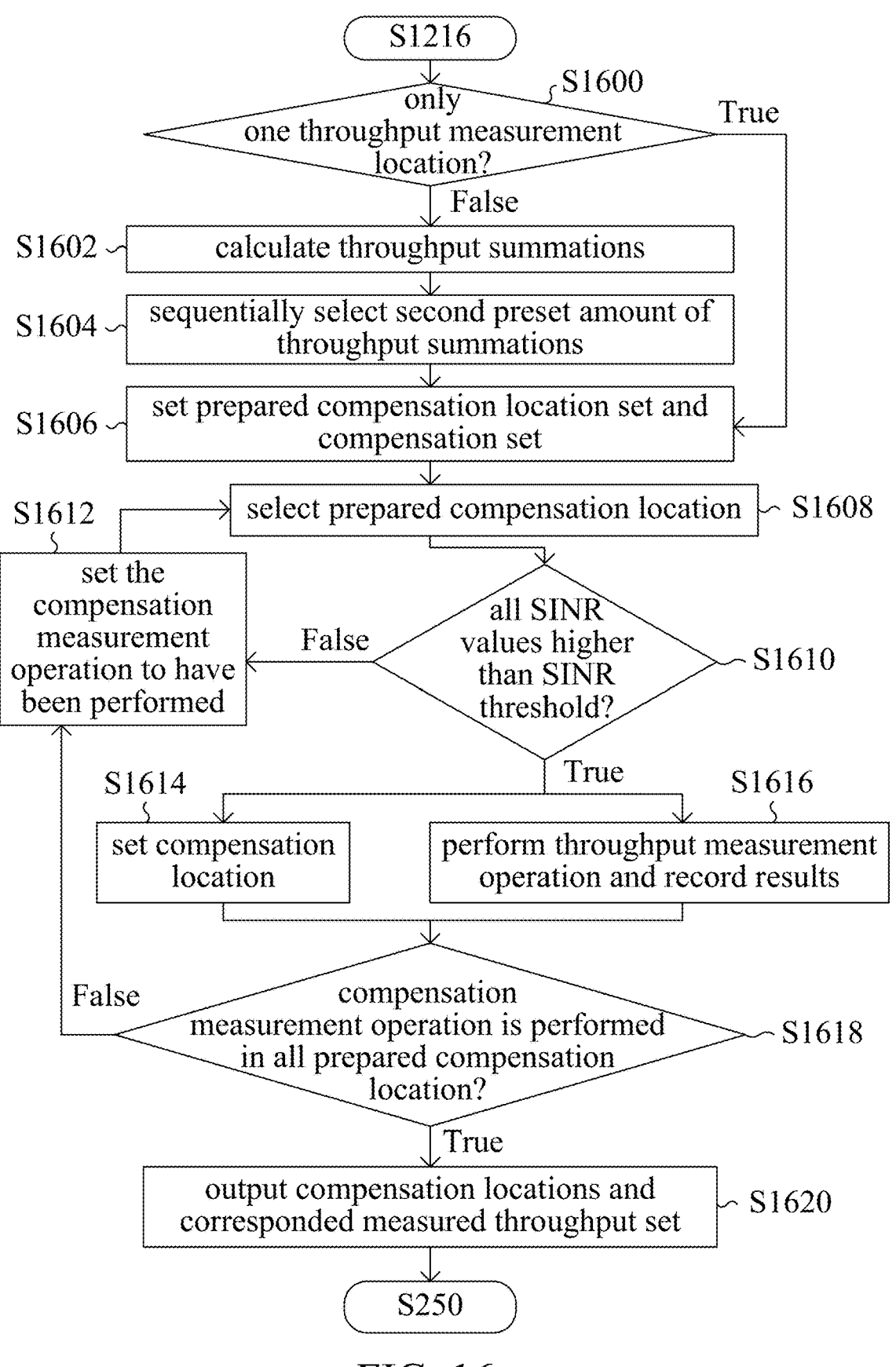
FIG. 16 is a flow chart showing detailed operation of the step S1500 in accordance with one embodiment of the present invention.

Please refer to FIG. 16, which is a flow chart showing detailed operation of the step S1500 in accordance with one embodiment of the present invention. In this embodiment, it is determined in the step S1600 that whether an amount of the throughput measurement locations comprised in the throughput measurement location set output by the step S1216 is 1. When the determination result of the step S1600 is true, the flow goes to the step S1606 directly to set contents of a prepared compensation location set and a compensation set. On the contrary, when the determination result of the step S1600 is false, a plurality of throughput summations are calculated in the step S1602, wherein the throughput summations are one-by-one corresponding to the throughput measurement locations, and each of the throughput summation is calculated by summing the measured throughputs in the measured throughput set corresponding to the throughput measurement location to which the throughput summation is corresponded. After that, operations are performed in the step S1604 such that the throughput measurement locations are sorted in accordance with the throughput summations corresponded thereto, a second preset amount of the throughput summations are selected in an order of values of the throughput summations, and the selected throughput summations are output along with the throughput measurement locations corresponded to the selected throughput summations. The second preset amount in this embodiment could be determined in accordance with actual needs and is not limited in the technique solutions provided by the present invention.

It is noted that, as described in previous embodiments, the candidate locations in the throughput measurement location set could be sorted in accordance with the throughput summations corresponded thereto. Therefore, the step S1602 can be omitted from the flow when the candidate locations within the throughput measurement location set output in the step S1216 are already sorted in accordance with the throughput summations corresponded thereto. Furthermore, when the second preset amount is the amount of the throughput summations and the throughput measurement location set are sorted in advance, the step S1604 can also be omitted from the flow. In the situation of omitting both the step S1602 and the step S1604, the determination operation performed in the step S1600 can be omitted as well, and, therefore, the flow goes to the step S1606 directly from the step S1216.

No matter how many throughput measurement locations are selected by the step S1216, each of the candidate locations neighboring to anyone of the selected throughput measurement locations is set to be a prepared compensation location comprised in a prepared compensation location set in the step S1606. In other words, the candidate location within nine-square division centered at one of the selected throughput measurement locations is set to be a prepared compensation location in the step S1606. Besides this, the SINR measurement set corresponding to a candidate location is retrieved while setting the candidate location to a prepared compensation location, wherein the retrieved SINR measurement set and the prepared compensation location are set to be corresponded to each other. In this embodiment, when the SINR measurement set corresponding to the candidate location set to be the prepared compensation location does exist, the SINR measurement set corresponding to the candidate location can be set as a compensation set corresponding to the prepared compensation location. On the contrary, when the SINR measurement set corresponding to the candidate location set to be the prepared compensation location does not exist, a SINR measurement set corresponding to the candidate location can be measured and recorded by the technique solutions described above, and then the SINR measurement set is set to be the compensation set corresponding to the prepared compensation location as well.

The technique solution described above will be illustrated with a specific example below. Please also refer to FIG. 17, which is a schematic diagram showing the throughput measurement location set and the corresponded measured throughput set in accordance with one embodiment of the present invention. In this embodiment, the throughput measurement location sets output by the step S1216 are sorted in the order of throughput summations corresponded thereto, i.e., the throughput summations are sorted from high to low while the throughput measurement locations sets are arranged in the order the same as that in which the throughput summations corresponded thereto are arranged. As shown in FIG. 17, the leftmost column represents the throughput measurement location (or the candidate location) in which the throughput measurement operation is performed. The five columns following the leftmost column represent the measured throughput TP138 which corresponds to the user device 138 and the throughput measurement location, the measured throughput TP136 which corresponds to the used device 136 and the throughput measurement location, the measured throughput TP134 which corresponds to the used device 134 and the throughput measurement location, the measured throughput TP132 which corresponds to the used device 132 and the throughput measurement location, and the measured throughput TP 130 which corresponds to the used device 130 and the throughput measurement location. The rightmost column is the throughput summation TT which represents summation of the five measured throughput TP130-TP138 corresponding to the same throughput measurement location.

It can be found in FIG. 17 that the candidate locations comprised in the throughput measurement location set output by the step S1216 are the nine candidate locations 303, 306, 313, 315, 319, 320, 326, 331 and 338, wherein the throughput summation TT corresponding to the candidate location 320 is higher than the throughput summations TT corresponding to the candidate locations other than the candidate location 320 while the throughput summation TT corresponding to the candidate location 338 is lower than the throughput summations TT corresponding to the candidate locations other than the candidate location 338. When the second preset amount of the throughput measurement locations refer to all the throughput measurement locations, a candidate location within one of the nine-square divisions which are centered at the throughput measurement locations 303, 306, 313, 315, 319, 320, 326, 331 and 338 respectively, is set to be one compensation location. When the second preset amount of the throughput measurement locations refer to only a part of the throughput measurement locations, the candidate location within one of the nine-square divisions which are centered at the throughput measurement locations in front part of the throughput measurement location set are set to be the compensation location. For example, when the second preset amount refers to half of the amount of the throughput measurement locations, only the candidate locations within one of the nine-square divisions, which are centered at the throughput measurement locations 320, 306, 313, 326 and 331, i.e., the throughput measurement locations arranged in front-half part of the throughput measurement location set, would be set to be the compensation locations, respectively.

Please refer to FIG. 16 again. After setting the prepared compensation location set and the compensation set, a compensation measurement operation is performed in each prepared compensation location comprised in the prepared compensation location set, wherein the compensation measurement operation comprises the steps S1608-S1620 as described below.

Firstly, in the step S1608, a prepared compensation location in which the compensation measurement operation has not been performed is selected from the measured throughput set, and the compensation set corresponding to the prepared compensation location is retrieved as well. After that, in the step S1610, it is determined that whether all the SINR values within the compensation set are higher than the SINR threshold. When a determination result of the step S1610 is false, which means that the wireless connectivity in the prepared compensation location is poor, it is set that the compensation measurement operation has been performed in the prepared compensation location without actually performing the compensation measurement operation in the prepared compensation location (step S1612). After completing the step S1612, the flow goes to the step S1608 to select a new prepared compensation location. It can be found that, since it is set that the compensation measurement operation has been performed in the original prepared compensation location in the step S1612, the original prepared compensation location would not be selected as the new prepared compensation location when the flow goes to the step S1608 from the step S1612.

On the contrary, when the determination result of the step S1610 is true, which means that the wireless connectivity in the prepared compensation location is acceptable, the prepared compensation location is further set to be a compensation location in the step S1614, and the throughput measurement operation is then performed in the compensation location to record and output the measured results as the measured throughput set corresponding to the compensation location in the step S1616. After completing the steps S1614 and S1616, it is determined in the step S1618 that whether the compensation measurement operation is performed in each prepared compensation location. When a determination result of the step S1618 is false, the flow goes to the step S1612 to set that the compensation measurement operation has been performed in the prepared compensation location and then goes to the step S1608 to select a new prepared compensation location in which the compensation measurement operation has not been performed. On the contrary, when the determination result of the step S1618 is true, the flow goes to the step S1620 to output the compensation locations and the measured throughput set corresponding to the compensation locations as the data referenced while deciding the base location.

It can be found in the description made above that technicians could adjust an amount of times for performing measurement operations by using the technique solutions provided in the present invention so that manpower and time cost for deciding the base location could be controlled.

In summary, the method for determining location of the wireless network base station provided by the present invention determines construction probabilities of candidate locations for building wireless base station in advance by using estimated signal power, therefore real measurement operations could be performed only in the candidate locations with high construction probability so that an amount of the real measurement operations is reduced accordingly. Furthermore, the construction probabilities can be adjusted by referencing to the estimated average power of each user device in the candidate location, the data range covering the estimated average power or distance between the user device and the candidate location so that accuracy of predictions of the construction probabilities could be improved. Moreover, it is possible to reduce the probability of location misjudgment due to wrong estimation by determining whether extra locations in which measurement is performed are necessary in accordance with results of real measurements performed in the selected candidate locations.

What is claimed is:

1. A method for determining location of wireless network base station, which is adapted to determine a base location of the wireless network base station within a specific area in accordance with distribution of a plurality of user devices within the specific area, comprising:

deciding a plurality of candidate locations within the specific area;

retrieving a plurality of position information, wherein each of the position information corresponds to a position of one of the user devices;

obtaining a plurality of received power estimation values, wherein each of the received power estimation values is a signal strength of a first wireless signal received by corresponding one of the user devices when the first wireless signal is transmitted from corresponding one of the candidate locations, and the signal strength is generated by a predetermined signal strength estimation procedure in accordance with obstacles within the specific area and a relative displacement obtained from the corresponding one of the candidate locations and the position information of the corresponding one of the user devices;

obtaining a predicting sequence composed of the candidate locations from sorting a plurality of construction probabilities, each of which is corresponded to one of the candidate locations, from high to low, wherein, the construction probabilities are determined by a plurality of estimation sets, and each of the estimation sets is corresponded to one of the candidate locations and composed of the received power estimation values each corresponding to one of all the user devices when the first wireless signal is transmitted from the corresponded candidate locations;

selecting a preset amount of the candidate locations from the predicting sequence in order as a starting sequence;

performing, for each of the candidate locations of the starting sequence, an actual measuring operation in the candidate location to obtain a corresponded measurement result; and deciding the base location in accordance with the obtained measurement results.

2. The method as claimed in claim 1, wherein the position information comprises a coordinate data which represents the corresponded position of one of the user devices in coordinates.

3. The method as claimed in claim 1, wherein the step of obtaining the predicting sequence composed of the candidate locations from sorting the construction probabilities, each of which is corresponded to one of the candidate locations, from high to low, wherein, the construction probabilities are determined by the estimation sets, and each of the estimation sets is corresponded to one of the candidate locations and composed of the received power estimation values each corresponding to one of all the user devices when the first wireless signal is transmitted from the corresponded candidate locations, comprises:

obtaining, for each of the candidate locations, an average power corresponded thereto by averaging the received power estimation values of the estimation set corresponded thereto;

setting, for each of the candidate locations, a first weight corresponded thereto in accordance with an order of the average power corresponded thereto obtained by sorting the average powers from high to low; and determining, for each of the candidate locations, the construction probability corresponded thereto in accordance with the first weight corresponded thereto.

4. The method as claimed in claim 1, wherein the step of obtaining the predicting sequence composed of the candidate locations from sorting the construction probabilities, each of which is corresponded to one of the candidate locations, from high to low, wherein, the construction probabilities are determined by the estimation sets, and each of the estimation sets is corresponded to one of the candidate locations and composed of the received power estimation values each corresponding to one of all the user devices when the first wireless signal is transmitted from the corresponded candidate locations, comprises:

retrieving a range table, wherein the range table comprises a plurality of data ranges and a plurality of weight adjustments while each of the data ranges being corresponded to one of the weight adjustments;

performing, for each of the candidate locations, a judgement operation to obtain a second weight corresponded thereto, wherein the judgement operation comprises:

retrieving, for each of the received power estimation value of the estimation set corresponded to the candidate location, a temporary adjustment corresponding to the received power estimation value, wherein the temporary adjustment is the weight adjustment to which the data range covering the received power estimation value is corresponded; and averaging the temporary adjustments corresponding to the received power estimation values of the estimation set as the second weight; and determining, for each of the candidate locations, the construction probability corresponded thereto in accordance with the second weight corresponded thereto.

5. The method as claimed in claim 1, wherein the step of obtaining the predicting sequence composed of the candidate locations from sorting the construction probabilities, each of which is corresponded to one of the candidate locations, from high to low, wherein, the construction probabilities are determined by the estimation sets, and each of the estimation sets is corresponded to one of the candidate locations and composed of the received power estimation values each corresponding to one of all the user devices when the first wireless signal is transmitted from the corresponded candidate locations, comprises:

obtaining, for each of the candidate locations, an average power corresponded thereto by averaging the received power estimation values of the estimation set corresponded thereto;

setting, for each of the candidate locations, a first weight corresponded thereto in accordance with an order of the average power corresponded thereto obtained by sorting the average powers from high to low;

retrieving a range table, wherein the range table comprises a plurality of data ranges and a plurality of weight adjustments while each of the data ranges being corresponded to one of the weight adjustments;

performing, for each of the candidate locations, a judgement operation to obtain a second weight corresponded thereto, wherein the judgement operation comprises:

retrieving, for each of the received power estimation value of the estimation set corresponded to the candidate location, a temporary adjustment corresponding to the received power estimation value, wherein the temporary adjustment is the weight adjustment to which the data range covering the received power estimation value is corresponded; and averaging the temporary adjustments corresponding to the received power estimation values of the estimation set as the second weight;

obtaining, for each of the candidate locations, a distance summation by summing a plurality of distances each being between the candidate location and one of all the user devices;

setting, for each of the candidate locations, a third weight corresponded thereto in accordance with the distance summation corresponded thereto; and determining, for each of the candidate locations, the construction probability corresponded thereto in accordance with the first weight, the second weight and the third weight corresponded thereto.

6. The method as claimed in claim 1, further comprising a SINR threshold determination operation which is performed before performing the actual measuring operation, wherein the SINR threshold determination operation comprises:

step A: obtaining a plurality of average powers, wherein each of the average powers corresponds to one of the candidate locations and is obtained by averaging the received power estimation values of the estimation set corresponding to the corresponded one of the candidate locations;

step B: sorting the average powers from high to low to obtain a sorting result and generating a SINR measurement sequence by arranging the candidate locations in accordance with an order in which the average powers corresponded thereto are arranged in the sorting result;

step C: selecting from beginning of the SINR measurement sequence a first one of the candidate locations in which a SINR measurement operation has not been performed as a SINR measurement location;

step D: performing the SINR measurement operation in the SINR measurement location and recording a SINR measurement set corresponding to the SINR measurement location accordingly, wherein the SINR measurement set corresponding to the SINR measurement location comprises a plurality of SINR values, and each of the SINR values is obtained by performing the SINR measurement operation comprising measuring a second wireless signal, which is emitted from a place where one of the user devices is, in the SINR measurement location;

step E: determining whether an amount of the recorded SINR measurement sets is equal to a first preset amount after each time the SINR measurement set being recorded;

step F: when a determination result of the step E is false, selecting one of the candidate locations in which the SINR measurement operation has not been performed in accordance with the SINR measurement set corresponding to the SINR measurement location as a newly selected SINR measurement location and entering the step D with replacing the SINR measurement location by the newly selected SINR measurement location; and step G: when the determination result of the step E is true, determining a SINR threshold in accordance with the recorded SINR measurement sets and providing the SINR threshold for the actual measuring operation.

7. The method as claimed in claim 6, wherein the step F comprises:

selecting the user device whose SINR value measured in the SINR measurement location is less than the SINR values of any other of the user devices measured in the SINR measurement location;

obtaining the position information of the selected user device;

selecting one of the candidate locations which are determined to be closer to the user device than the SINR measurement location is in accordance with the relative displacement obtained from the obtained position information and the SINR measurement location as a prepared SINR measurement location; and determining what to proceed in accordance with whether the SINR measurement operation has been performed in the prepared SINR measurement location, comprising:

replacing the SINR measurement location by the prepared SINR measurement location and entering the step D when the SINR measurement operation has not been performed in the prepared SINR measurement location; and entering the step C when the SINR measurement operation has been performed in the prepared SINR measurement location.

8. The method as claimed in claim 7, wherein the step of selecting one of the candidate locations which are determined to be closer to the user device than the SINR measurement location is in accordance with the relative displacement obtained from the obtained position information and the SINR measurement location as the prepared SINR measurement location, comprises:

obtaining a movement amount by scaling the obtained relative displacement down to a predetermined ratio;

deciding a reference position which is reached by moving from the SINR measurement location for the movement amount; and taking one of the candidate locations which is nearest to the reference position as the prepared SINR measurement location.

9. The method as claimed in claim 6, wherein determining the SINR threshold in accordance with the recorded SINR measurement sets comprises:

for each of the recorded SINR measurement sets, selecting a lowest one of the SINR values in the recorded SINR measurement set as a lowest SINR value corresponding to the recorded SINR measurement set; and taking one of the lowest SINR values each corresponding to one of the recorded SINR measurement set as the SINR threshold.

10. The method as claimed in claim 6, wherein the actual measuring operation comprises:

step GA: selecting from beginning of the starting sequence a first one of the candidate locations for which an effective location judgement operation has not been performed as a prepared throughput measurement location;

step GB: when none of the SINR measurement sets is found to be corresponded to the prepared throughput measurement location, performing the SINR measurement operation in the prepared throughput measurement location and recording the SINR measurement set corresponding to the prepared throughput measurement location accordingly;

step GC: performing the effective location judgement operation for the prepared throughput measurement location, wherein the effective location judgement operation determines that the prepared throughput measurement location should be comprised in a throughput measurement location set when the SINR values of the SINR measurement set corresponding to the prepared throughput measurement location are higher than the SINR threshold, and determines that the prepared throughput measurement location should not be comprised in the throughput measurement location set when anyone of the SINR values of the SINR measurement set corresponding to the prepared throughput measurement location is not higher than the SINR threshold;

step GD: when the step GC determines that the prepared throughput measurement location should be comprised in the throughput measurement location set, setting the prepared throughput measurement location to be a throughput measurement location comprised in the throughput measurement location set, performing a throughput measurement operation in the throughput measurement location and storing a plurality of measured throughput generated thereby as a measured throughput set, wherein each of the measured throughput corresponds to a data throughput of one of the user device in the throughput measurement location;

step GE: when the step GC determines that the prepared throughput measurement location should not be comprised in the throughput measurement location set, replacing the prepared throughput measurement location by one of the candidate locations in which the throughput measurement operation has not been performed in accordance with the measured SINR measurement set and entering the step GB with the replaced prepared throughput measurement location; and step GF: outputting the throughput measurement location set and the measured throughput sets each corresponding to one of the throughput measurement locations comprised in the throughput measurement location set after the effective location judgement operation is performed for all the candidate locations of the starting sequence.

11. The method as claimed in claim 10, wherein the step GE comprises:

selecting one of the user devices, wherein the SINR value corresponding to the selected user device and measured in the prepared throughput measurement location is lower than the SINR values corresponding to others of the user devices and measured in the prepared throughput measurement location;

obtaining the position information of the selected user device;

selecting one of the candidate locations, which is closer to the user device than the prepared throughput measurement location is, as a prepared location in accordance with the relative displacement obtained from the obtained position information and the prepared throughput measurement location; and determining what to proceed in accordance with whether the throughput measurement operation has been performed in the prepared location, comprising:

replacing the prepared throughput measurement location by the prepared location and entering the step GB thereafter when the throughput measurement operation has not been performed in the prepared location; and entering the step GA when the throughput measurement operation has been performed in the prepared location.

12. The method as claimed in claim 10, further comprising:

setting the candidate locations neighboring to the throughput measurement location to be comprised in a prepared compensation location set when an amount of the throughput measurement locations comprised in the throughput measurement location set is one;

when the amount of the throughput measurement locations comprised in the throughput measurement location set is at least two, calculating, for each of the throughput measurement locations comprised in the throughput measurement location set, a throughput summation corresponding to the throughput measurement location, which is summation of the measured throughput of the measured throughput set corresponding to the throughput measurement location;

selecting, from high to low, a second preset amount of the throughput summations; and setting the candidate locations neighboring to each of the throughput measurement locations corresponding to the selected throughput summations to be comprised in the prepared compensation location set;

obtaining, for each the throughput measurement location comprised in the prepared compensation location set, the SINR measurement set corresponding to the throughput measurement location and setting the SINR measurement set as a compensation set; and performing a compensation measurement operation for each the throughput measurement location comprised in the prepared compensation location set, wherein the compensation measurement operation comprises:

determining whether the SINR values comprised in the compensation set corresponding to the throughput measurement location are all higher than the SINR threshold; and when the determination is true, setting the candidate location corresponding to the compensation set as a compensation location, performing the throughput measurement operation in the compensation location and storing the measured throughput generated thereby as the measured throughput set corresponding to the compensation location, and outputting the compensation location and the measured throughput set corresponding to the output compensation location.

* * * * *